US012781038B2

(12) United States Patent
Anderson et al.

(10) Patent No.: US 12,781,038 B2
(45) Date of Patent: Nov. 3, 2026

(54) ADDITIVES TO STABILIZE POLYACRYLAMIDE CO-POLYMER SOLUTIONS UNDER HIGH SHEAR CONDITIONS

(71) Applicant: BASF SE, Ludwigshafen am Rhein (DE)

(72) Inventors: Timothy H. Anderson, Cincinnati, OH (US); Dean A. Oester, Cincinnati, OH (US); Melvin Long, Cincinnati, OH (US)

(73) Assignee: BASF SE, Ludwigshafen am Rhein (DE)

( * ) Notice: Subject to any disclaimer, the term of this patent is extended or adjusted under 35 U.S.C. 154(b) by 446 days.

(21) Appl. No.: 17/286,172

(22) PCT Filed: Oct. 8, 2019

(86) PCT No.: PCT/US2019/055241
§ 371 (c)(1),
(2) Date: Apr. 16, 2021

(87) PCT Pub. No.: WO2020/081298
PCT Pub. Date: Apr. 23, 2020

(65) Prior Publication Data

US 2021/0347976 A1 Nov. 11, 2021

Related U.S. Application Data

(60) Provisional application No. 62/746,807, filed on Oct. 17, 2018.

(51) Int. Cl.

| | |
|---|---|
| ***C08L 33/26*** | (2006.01) |
| ***A01N 37/40*** | (2006.01) |
| ***A01N 57/20*** | (2006.01) |
| ***C08K 5/095*** | (2006.01) |
| ***C08K 5/524*** | (2006.01) |
| ***C08L 39/06*** | (2006.01) |

(52) U.S. Cl.
CPC .............. *C08L 33/26* (2013.01); *A01N 37/40* (2013.01); *A01N 57/20* (2013.01); *C08L 39/06* (2013.01); *C08K 5/095* (2013.01); *C08K 5/524* (2013.01)

(58) Field of Classification Search
CPC .......... C08L 33/26; C08L 39/06; C08L 71/02; C08L 87/005; A01N 25/04; A01N 25/10; A01N 37/04; A01N 57/20
See application file for complete search history.

(56) References Cited

U.S. PATENT DOCUMENTS

| | | | |
|---|---|---|---|
| 9,034,960 B2 | 5/2015 | Brown et al. | |
| 2014/0378554 A1 | 12/2014 | Sexton et al. | |
| 2015/0181865 A1 | 7/2015 | Schnabel et al. | |
| 2015/0245606 A1 | 9/2015 | Drew et al. | |
| 2019/0343987 A1* | 11/2019 | Bennis | A61L 31/10 |

FOREIGN PATENT DOCUMENTS

| | | | |
|---|---|---|---|
| CN | 103849297 A * | 6/2014 | |
| CN | 105969009 A * | 9/2016 | C09D 133/00 |
| WO | 2006045714 A1 | 5/2006 | |

OTHER PUBLICATIONS

Bondar, O.V. et al. BioNanoScience vol. 5 pp. 91-96 (Year: 2015).*
Naskar, B. et al. Langmuir vol. 28 pp. 7134-7146 (Year: 2012).*
CN105969009 Machine translation (Year: 2025).*
CN103849297 machine translation (Year: 2025).*
International Search Report and Written Opinion for corresponding PCT/US2019/055241 mailed Jan. 23, 2020, 9 Pages.

* cited by examiner

*Primary Examiner* — Jeffrey S Lenihan
(74) *Attorney, Agent, or Firm* — Baltazar Gomez

(57) ABSTRACT

Described herein are compositions and methods for stabilizing the ability of hydrated polyacrylamide co-polymers to modify the physical properties of water solutions under high shear conditions. The compositions generally include a water solution including at least one hydrated polyacrylamide co-polymer; and at least one additive selected from the group consisting of i) a component having the formula of Formula 1, where Formula 1 is $R_1$—O-$EO_a$-$PO_b$-$EO_c$—$PO_d$—$R_2$, where $R_1$ is hydrogen or any $C_1$ to $C_{18}$ carbon or carbon chain; O is oxygen, $EO_a$ is —$(CH_2CH_2—O)_a$ where a can be from 0-500; $PO_b$ is —$(CH(CH_3)CH_2—O)_b$ where b can be from 0-70; $EO_c$ is —$(CH_2CH_2—O)_c$ where c can be from 0-150; $PO_d$ is —$CH(CH_3)CH_2—O)_d$ where d is from 0-30; and $R_2$ is hydrogen or any $C_1$ to $C_{18}$ carbon or carbon chain; ii) a tetra functional block copolymer; iii) a polyvinylpyrrolidone (PVP) homopolymer; and iv) any combination thereof.

14 Claims, 9 Drawing Sheets

ADDITIVES TO STABILIZE POLYACRYLAMIDE CO-POLYMER SOLUTIONS UNDER HIGH SHEAR CONDITIONS

CROSS-REFERENCE TO RELATED APPLICATIONS

This application is a U.S. National Phase Application of International Patent Application No. PCT/US2019/055241, filed Oct. 8, 2019, which claims the benefit of priority to United States Provisional Patent Application No. 62/746,807, filed Oct. 17, 2018, the entire contents of which are hereby incorporated by reference herein.

BACKGROUND

Hydrated polyacrylamide co-polymers are used to modify the physical properties of water solutions in a variety of industries. When these hydrated polyacrylamide co-polymers are subjected to high shear environments, their ability to modify the physical properties of the water solutions is reduced. In the case of sprayable herbicides, pesticides, and fungicides, hydrated polyacrylamide co-polymers are used as anti-drift or drift reduction agents in order to prevent the formation of liquid droplets that are too small to control their application within the desired confines. However, under shear or high shear conditions such as those found in spray and pump systems used for such compositions, the effectiveness of the hydrated polyacrylamide co-polymers may be reduced, thereby permitting the formation of "too-small" droplets. When these small droplets are allowed to form, they are easily subjected to "drift" which carries them outside of the intended application area. Not only is this inefficient in that the intended application area does not receive the intended amount of product, but the droplets in the drift can be detrimental to the adjacent crops, land, and water sources. What is needed is a composition and accompanying methods of making using the composition that improves the stability and retains the ability to modify physical properties of hydrated polyacrylamide co-polymers in water solution under high shear conditions. What is further needed is a composition that improves the performance of anti-drift or drift reduction agents.

SUMMARY OF THE DISCLOSURE

The present disclosure overcomes the problems inherent in the art and provides additives effective for preserving the capabilities of hydrated polyacrylamide homopolymers and co-polymers to modify the physical properties of water solutions under shear and high shear conditions (collectively "shear"). For purposes of the present disclosure, hydrated polyacrylamide "homopolymers" and hydrated polyacrylamide "co-polymers" shall be used interchangeably and use of either term will encompass the other. Advantageously, the additives disclosed herein improve the stability of hydrated polyacrylamide co-polymers resulting in the retention of their properties, even under shear including high shear conditions. In some forms, the shear is common to agricultural applications. With respect to agrochemicals such as sprayable herbicides, pesticides, and fungicides (collectively referred to as "pesticides"), water droplet sizes can be controlled and drift reduced by using the additives of the present disclosure in combination with polymers known to modify water droplets. Thus, such agrochemicals can be applied in the proper amounts and in the proper locations to result in the greatest efficiency for the desired application. Some pesticides useful with the present disclosure include, but are not limited to Acetylcholine esterase (AChE) inhibitors, carbamates (e.g. aldicarb, alanycarb, ben-diocarb, benfuracarb, butocarboxim, butoxycarboxim, carbaryl, carbofuran, carbosulfan, ethio-fencarb, fenobucarb, formetanate, furathiocarb, isoprocarb, methiocarb, methomyl, metolcarb, oxamyl, pirimicarb, propoxur, thiodicarb, thiofanox, trimethacarb, XMC, xylylcarb and triazamate), organophosphates (e.g. acephate, azamethiphos, azinphos-ethyl, azinphosmethyl, cadusafos, chlorethoxyfos, chlorfenvinphos, chlormephos, chlorpyrifos, chlorpyri-fos-methyl, coumaphos, cyanophos, demeton-S-methyl, diazinon, dichlorvos/DDVP, dicroto-phos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothio-phosphoryl) salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimi-phos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, and vamidothion) GABA-gated chloride channel antagonists, cyclodiene organochlorine compounds (e.g. endosulfan or chlordane), fiproles (phenylpyrazoles) (e.g. ethiprole, fipronil, flufiprole, pyrafluprole, and pyriprole), Sodium channel modulators from the class of pyrethroids (e.g. acrinathrin, allethrin, d-cis-trans allethrin, d-trans allethrin, bifenthrin, kappa-bifenthrin, bioallethrin, bioallethrin S-cylclopentenyl, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin, deltamethrin, empenthrin, esfenvalerate, etofenprox, fenpropathrin, fenvalerate, flucythrinate, flumethrin, tau-fluvalinate, halfenprox, hep-tafluthrin, imiprothrin, meperfluthrin, metofluthrin, momfluorothrin, epsilon-momfluorothrin, per-methrin, phenothrin, prallethrin, profluthrin, pyrethrin (pyrethrum), resmethrin, silafluofen, tefluth-rin, kappa-tefluthrin, tetramethylfluthrin, tetramethrin, tralomethrin, and transfluthrin), sodium channel modulators (e.g. DDT or methoxychlor), Nicotinic acetylcholine receptor agonists (nAChR), neonicotinoids (e.g. acetamiprid, clothianidin, cycloxaprid, dinotefuran, imidacloprid, nitenpyram, thiacloprid and thiamethoxam), 1 4,5-Dihydro-N-nitro-1-(2-oxiranylmethyl)-1H-imidazol-2-amine, (2E-)-1-[(6-Chloropyridin-3-yl) methyl]-N-nitro-2-pentylidenehydrazinecarboximidamide, 1-[(6-Chloropyridin-3-yl)methyl]-7-methyl-8-nitro-5-propoxy-1,2,3,5,6,7-hexahydroimidazo[1,2-a]pyridine, nicotine, sulfoxaflor, flupyradifurone, triflumezopyrim, Nicotinic acetylcholine receptor allosteric activators, spinosyns (e.g. spinosad or spinetoram), Chloride channel activators from the class of avermectins and milbemycins (e.g. abamectin, emamectin benzoate, ivermectin, lepimectin, or milbemectin), Juvenile hormone mimics (e.g. juvenile hormone analogues hydroprene, kino-prene, and methoprene), fenoxycarb, pyriproxyfen, miscellaneous non-specific (multi-site) inhibitors (e.g. alkyl halides as methyl bromide and other alkyl halides), chloropicrin, sulfuryl fluoride, borax, tartar emetic, Chordotonal organ TRPV channel modulators (e.g. pymetrozine and pyrifluquinazon), Mite growth inhibitors (e.g. clofentezine, hexythiazox, and diflovidazin, or etoxazole), Microbial disruptors of insect midgut membranes (e.g. *Bacillus thuringiensis* or *Bacillus*

*sphaericus* and the insecticdal proteins they produce such as *Bacillus thuringiensis* subsp. is-raelensis, *Bacillus sphaericus, Bacillus thuringiensis* subsp. *aizawai, Bacillus thuringiensis* subsp. kurstaki and *Bacillus thuringiensis* subsp. tenebrionis, or the Bt crop proteins: Cry1Ab, Cry1Ac, Cry1Fa, Cry2Ab, mCry3A, Cry3Ab, Cry3Bb, and Cry34/35Ab1), Inhibitors of mitochondrial ATP synthase (e.g. diafenthiuron or organotin miticides such as azocyclotin, cyhexatin, fenbutatin oxide, propargite, tetra-difon), Uncouplers of oxidative phosphorylation via disruption of the proton gradient (e.g. chlorfenapyr, DNOC, or sulfluramid), Nicotinic acetylcholine receptor (nAChR) channel blockers (e.g. nereistoxin analogues bensultap, cartap hydrochloride, thiocyclam, or thiosultap sodium), Inhibitors of the chitin biosynthesis type 0 (e.g. benzoylureas e.g. bistrifluron, chlorfluazuron, diflubenzuron, flucycloxuron, flufenoxuron, hexaflumuron, lufenuron, novaluron, noviflumuron, teflubenzuron, or triflumuron), Inhibitors of the chitin biosynthesis type 1 (e.g. buprofezin), Moulting disruptors (e.g. Dipteran or cyromazine), Ecdyson receptor agonists (e.g. diacylhydrazines including methoxyfenozide, tebufenozide, halofenozide, fufenozide, or chromafenozide), Octopamin receptor agonists (e.g. amitraz), Mitochondrial complex III electron transport inhibitors (e.g. hydramethylnon, acequinocyl, fluacrypyrim, or bifenazate), Mitochondrial complex I electron transport inhibitors (e.g. METI acaricides and in-secticides such as fenazaquin, fenpyroximate, pyrimidifen, pyridaben, tebufenpyrad or tolfen-pyrad, or rotenone), Voltage-dependent sodium channel blockers (e.g. indoxacarb, metaflumizo-ne, 2-[2-(4-Cyanophenyl)-1-[3-(trifluoromethyl)phenyl]ethylidene]-N-[4-(difluoromethoxy)phenyl]-hydrazinecarboxamide or N-(3-Chloro-2-methylphenyl)-2-[(4-chlorophenyl)[4-[methyl (methylsulfonyl)amino]phenyl]methylene]-hydrazinecarboxamide), Inhibitors of the of acetyl CoA carboxylase (e.g. Tetronic and Tetramic acid derivatives, e.g. spirodiclofen, spiromesifen, spirotetramat, or spiropidion), Mitochondrial complex IV electron transport inhibitors (e.g. phosphine (such as aluminium phosphide, calcium phosphide, phosphine or zinc phosphide), or cyanide), Mitochondrial complex II electron transport inhibitors (e.g. beta-ketonitrile derivatives such as cyenopyrafen or cyflumetofen), Ryanodine receptor-modulators from the class of diamides (e.g. flubendiamide, chlor-antraniliprole, cyantraniliprole, tetraniliprole, (R)-3-Chlor-N1-{2-methyl-4-[1,2,2,2-tetrafluoro-1-(trifluoromethyl)ethyl]phenyl}-N2-(1-methyl-2-methylsulfonylethyl)phthalamid, (S)-3-Chloro-N1-{2-methyl-4-[1,2,2,2-tetrafluoro-1-(trifluoromethyl) ethyl]phenyl}-N2-(1-methyl-2-methylsulfonylethyl) phthalamid, cyclaniliprole, methyl-2-[3,5-dibromo-2-({[3-bromo-1-(3-chlorpyridin-2-yl)-1H-pyrazol-5-yl] carbonyl}amino)benzoyl]-1,2-dimethylhydrazinecarboxylate, N-[4,6-dichloro-2-[(diethyl-lambda-4-sulfanylidene)-carbamoyl]-phenyl]-2-(3-chloro-2-pyridyl)-5-(trifluoromethyl)pyrazole-3-carboxamide, N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide; M.28.5c) N-[4-chloro-2-[(di-2-propyl-lambda-4-sulfanylidene)carbamoyl]-6-methyl-phenyl]-2-(3-chloro-2-pyridyl)-5-(trifluoromethyl) pyrazole-3-carboxamide, N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide, N-[4, 6-dibromo-2-[(diethyl-lambda-4-sulfanylidene)carbamoyl]-phenyl]-2-(3-chloro-2-pyridyl)-5-(trifluoromethyl) pyrazole-3-carboxamide, N-[2-(5-Amino-1,3,4-thiadiazol-2-yl)-4-chloro-6-methylphenyl]-3-bromo-1-(3-chloro-2-pyridinyl)-1H-pyrazole-5-carboxamide, 3-Chloro-1-(3-chloro-2-pyridinyl)-N-[2,4-dichloro-6-[[(1-cyano-1-methylethyl)amino]carbonyl]phenyl]-1H-pyrazole-5-carboxamide, 3-Bromo-N-[2,4-dichloro-6-(methylcarbamoyl)phenyl]-1-(3,5-dichloro-2-pyridyl)-1H-pyrazole-5-carboxamide, or N-[4-Chloro-2-[[(1,1-dimethylethyl)amino]carbonyl]-6-methyl-phenyl]-1-(3-chloro-2-pyridinyl)-3-(fluoromethoxy)-1H-pyrazole-5-carboxamide), cyhalodiamide, Chordotonal organ Modulators having an undefined target site (e.g. flonicamid), insecticidal active compounds of unknown or uncertain mode of action (e.g. afidopyro-pen, afoxolaner, azadirachtin, amidoflumet, benzoximate, broflanilide, bromopropy-late, chinomethionat, cryolite, dicloromezotiaz, dicofol, flufenerim, flometoquin, fluensulfone, fluhexafon, fluopyram, fluralaner, metaldehyde, metoxadiazone, piperonyl butoxide, pyflubumide, pyridalyl, or tioxazafen), 11-(4-chloro-2,6-dimethylphenyl)-12-hydroxy-1,4-dioxa-9-azadispiro [4.2.4.2]-tetradec-11-en-10-one, 3-(4'-fluoro-2,4-dimethylbiphenyl-3-yl)-4-hydroxy-8-oxa-1-azaspiro[4.5]dec-3-en-2-one, 1-[2-fluoro-4-methyl-5-[(2,2,2-trifluoroethyl)sulfinyl] phenyl]-3-(trifluoromethyl)-1H-1,2,4-triazole-5-amine, or actives on basis of *Bacillus firmus* (Votivo, I-1582), flupyrimin, fluazaindolizine, 4-[5-[3,5-dichlorophenyl)-5-(trifluoromethyl)-4H-isoxazol-3-yl]-2-methyl-N-(1-oxothietan-3-yl)benzamide, fluxametamide, 5-[3-[2,6-dichloro-4-(3,3-dichloroallyloxy)phenoxy]propoxy]-1H-pyrazole, 4-cyano-N-[2-cyano-5-[[2,6-dibromo-4-[1,2,2,3,3,3-hexafluoro-1-(trifluoromethyl)propyl]phenyl]carbamoyl]phenyl]-2-methyl-benzamide, 4-cyano-3-[(4-cyano-2-methyl-benzoyl) amino]-N-[2,6-dichloro-4-[1,2,2,3,3,3-hexafluoro-1-(trifluoromethyl)-propyl]phenyl]-2-fluoro-benzamide, N-[5-[[2-chloro-6-cyano-4-[1,2,2,3,3,3-hexafluoro-1-(trifluoromethyl)propyl]phenyl]carbamoyl]-2-cyano-phenyl]-4-cyano-2-methyl-benzamide, N-[5-[[2-bromo-6-chloro-4-[2,2,2-trifluoro-1-hydroxy-1-(trifluoromethyl) ethyl]phenyl]carbamoyl]-2-cy ano-phenyl]-4-cyano-2-methyl-benzamide, N-[5-[[2-bromo-6-chloro-4-[1,2,2,3,3,3-hexafluoro-1-(trifluoromethyl)-propyl]phenyl] carbamoyl]-2-cyano-phenyl]-4-cyano-2-methyl-benzamide, 4-cyano-N-[2-cyano-5-[[2,6-dichloro-4-[1,2,2,3,3,3-hexafluoro-1-(trifluoromethyl)-propyl]phenyl]carbamoyl] phenyl]-2-methyl-benzamide, 4-cyano-N-[2-cyano-5-[[2,6-dichloro-4-[1,2,2,2-tetrafluoro-1-(trifluoromethyl)ethyl] phenyl]carbamoyl]phenyl]-2-methyl-benzamide, N-[5-[[2-bromo-6-chloro-4-[1,2,2,2-tetrafluoro-1-(trifluoromethyl) ethyl]phenyl]carbamoyl]-2-cyano-phenyl]-4-cyano-2-methyl-benzamide, 2-(1,3-Dioxan-2-yl)-6-[2-(3-pyridinyl)-5-thiazolyl]-pyridine, 2-[6-[2-(5-Fluoro-3-pyridinyl)-5-thiazolyl]-2-pyridinyl]-pyrimidine, 2-[6-[2-(3-Pyridinyl)-5-thiazolyl]-2-pyridinyl]-pyrimidine, N-Methylsulfonyl-6-[2-(3-pyridyl)thiazol-5-yl]pyridine-2-carboxamide, N-Methylsulfonyl-6-[2-(3-pyridyl)thiazol-5-yl]pyridine-2-carboxamide, 1-[(6-Chloro-3-pyridinyl)methyl]-1,2,3,5,6,7-hexahydro-5-methoxy-7-methyl-8-nitro-imidazo[1,2-a] pyridine, 1-[(6-Chloropyridin-3-yl)methyl]-7-methyl-8-nitro-1,2,3,5,6,7-hexahydroimidazo[1,2-a]pyridin-5-ol, 1-isopropyl-N,5-dimethyl-N-pyridazin-4-yl-pyrazole-4-carboxamide, 1-(1,2-dimethylpropyl)-N-ethyl-5-methyl-N-pyridazin-4-yl-pyrazole-4-carboxamide, N,5-dimethyl-N-pyridazin-4-yl-1-(2,2,2-trifluoro-1-methyl-ethyl)pyrazole-4-carboxamide, 1-[1-(1-cyanocyclopropypethyl]-N-ethyl-5-methyl-N-pyridazin-4-yl-pyrazole-4-carboxamide, N-ethyl-1-(2-fluoro-1-methyl-propyl)-5-methyl-N-pyridazin-4-yl-pyrazole-4-carboxamide, 1-(1,2-dimethylpropyl)-N,5-dimethyl-N-pyridazin-4-yl-pyrazole-4-carboxamide, 1-[1-(1-cyanocyclopropyl)ethyl]-N,5-dimethyl-N-pyridazin-4-yl-pyrazole-4-carboxamide, N-methyl-1-(2-fluoro-1-methyl-propyl]-5-methyl-N-pyridazin-4-yl-pyrazole-4-carboxamide, 1-(4,4-difluorocyclohexyl)-N-ethyl-5-methyl-N-pyridazin-4-yl-pyrazole-4-carboxamide, 1-(4,4-difluorocyclohexyl)-N,5-dimethyl-N-pyridazin-4-yl-pyrazole-4-carboxamide, N-(1-methylethyl)-2-(3-pyridinyl)-2H-indazole-4-carboxamide, N-cyclopropyl-2-(3-pyridinyl)-2H-indazole-4-carboxamide, N-cyclohexyl-2-(3-pyridinyl)-2H-indazole-4-carboxamide, 2-(3-pyridinyl)-N-(2,2,2-trifluoroethyl)-2H-indazole-4-carboxamide, 2-(3-pyridinyl)-N-[(tetrahydro-2-furanyl)methyl]-2H-indazole-5-carboxamide, methyl 2-[[2-(3-pyridinyl)-2H-indazol-5-yl]carbonyl]hydrazinecarboxylate, N-[(2,2-difluorocyclopropyl)methyl]-2-(3-pyridinyl)-2H-indazole-5-carboxamide, N-(2,2-difluoropropyl)-2-(3-pyridinyl)-2H-indazole-5-carboxamide, 2-(3-pyridinyl)-N-(2-pyrimidinylmethyl)-2H-indazole-5-carboxamide, N-[(5-methyl-2-pyrazinyl)methyl]-2-(3-pyridinyl)-2H-indazole-5-carboxamide, tyclopyrazoflor, sarolaner, lotilaner, N-[4-Chloro-3-[[(phenylmethyl)amino]carbonyl]phenyl]-1-methyl-3-(1,1,2,2,2-pentafluoroethyl)-4-(trifluoromethyl)-1H-pyrazole-5-carboxamide, 2-(3-ethylsulfonyl-2-pyridyl)-3-methyl-6-(trifluoromethyl)imidazo[4,5-b]pyridine, 2-[3-ethylsulfonyl-5-(trifluoromethyl)-2-pyridyl]-3-methyl-6-(trifluoromethyl)imidazo[4,5-b]pyridine, 4-[5-(3,5-dichlorophenyl)-5-(trifluoromethyl)-4H-isoxazol-3-yl]-N-[(4R)-2-ethyl-3-oxo-isoxazolidin-4-yl]-2-methyl-benzamide, 4-[5-(3,5-dichloro-4-fluoro-phenyl)-5-(trifluoromethyl)-4H-isoxazol-3-yl]-N—[(4R)-2-ethyl-3-oxo-isoxazolidin-4-yl]-2-methyl-benzamide, N-[4-chloro-3-(cyclopropylcarbamoyl)enyl]-2-methyl-5-(1,1,2,2,2-pentafluoroethyl)-4-(trifluoromethyl)pyrazole-3-carboxamide, N-[4-chloro-3-[(1-cyanocyclopropyl)carbamoyl]phenyl]-2-methyl-5-(1,1,2,2,2-pentafluoroethyl)-4-(trifluoromethyl)pyrazole-3-carboxamide, acynonapyr, benzpy-rimoxan, 2-chloro-N-(1-cyanocyclopropyl)-5-[1-[2-methyl-5-(1,1,2,2,2-pentafluoroethyl)-4-(trifluoromethyl)pyrazol-3-yl]pyrazol-4-yl]benzamide, Ox-azosulfyl, [(2S,3R,4R,5S,6S)-3,5-dimethoxy-6-methyl-4-propoxy-tetrahydropyran-2-yl]N-[4-[1-[4-(trifluoromethoxy)phenyl]-1,2,4-triazol-3-yl]phenyl]carbamate, [(2S,3R,4R,5S,6S)-3,4,5-trimethoxy-6-methyl-tetrahydropyran-2-yl]N-[4-[1-[4-(trifluoromethoxy)phenyl]-1,2,4-triazol-3-yl]phenyl]carbamate, [(2S,3R,4R,5S,6S)-3,5-dimethoxy-6-methyl-4-propoxy-tetrahydropyran-2-yl]N-[4-[1-[4-(1,1,2,2,2-pentafluoroethoxy)phenyl]-1,2,4-triazol-3-yl]phenyl]carbamate, [(2S,3R,4R,5S,6S)-3,4,5-trimethoxy-6-methyl-tetrahydropyran-2-yl]N-[4-[1-[4-(1,1,2,2,2-pentafluoroethoxy)phenyl]-1,2,4-triazol-3-yl]phenyl]carbamate, (2Z)-3-(2-isopropylphenyl)-2-[(E)-[4-[1-[4-(trifluoromethoxy)phenyl]-1,2,4-triazol-3-yl]phenyl]methylenehydrazono]thiazolidin-4-one, (2Z)-3-(2-isopropylphenyl)-2-[(E)-[4-[1-[4-(1,1,2,2,2-pentafluoroethoxy)phenyl]-1,2,4-triazol-3-yl]phenyl]methylenehydrazono]thiazolidin-4-one.

Other pesticides include, but are not limited to respiration inhibitors, inhibitors of complex III at Qo site (e.g. azoxystrobin, coumethoxystrobin, coumoxystrobin, dimoxystrobin, enestroburin, fenaminstrobin, fenoxystrobin/flufenoxystrobin, fluoxastrobin, kresoxim-methyl, mandestrobin, metominostrobin, orysastrobin, picoxystrobin, pyraclostrobin, pyrametostrobin, pyraoxystrobin, trifloxystrobin, 2 (2-(3-(2,6-dichlorophenyl)-1-methyl-allylideneaminooxymethyl)-phenyl)-2 methoxyimino-N methyl-acetamide, pyribencarb, triclopyricarb/chlorodincarb, fa-moxadone, fenamidone, methyl-N-[2-[(1,4-dimethyl-5 phenyl-pyrazol-3-yl)oxy-methyl]phenyl]-N-methoxy-carbamate, 1-[2-[[1-(4-chlorophenyl)pyrazol-3-yl]oxy-methyl]-3-methyl-phenyl]-4-methyl-tetrazol-5-one, (Z,2E) 5 [1-(2,4-dichloro-phenyl)pyrazol-3-yl]-oxy-2-methoxyimino-N,3-dimethyl-pent-3-enamide, (Z,2E) 5 [1 (4-chlorophenyl) pyrazol-3-yl]oxy-2-methoxyimino-N,3-dimethyl-pent-3-enamide, pyrim-inostrobin, bifujunzhi, or 2-(ortho-((2,5-dimethylphenyl-oxymethylen)phenyl)-3-methoxy-acrylic acid methylester), inhibitors of complex III at Qi site (e.g. cyazofamid, amisulbrom, [(6S,7R,8R) 8 benzyl-3-[(3-hydroxy-4-methoxy-pyridine-2-carbonyl)amino]-6-methyl-4,9-dioxo-1,5-dioxonan-7-yl] 2-methylpropanoate, or fenpicoxamid), inhibitors of complex II (e.g. benodanil, benzovindiflupyr, bixafen, bos-calid, carboxin, fenfuram, fluopyram, flutolanil, fluxapyrox-ad, furametpyr, isofetamid, isopyrazam, mepronil, oxycarboxin, penflufen, penthiopyrad, pydiflumetofen, pyraziflumid, sedaxane, tecloftalam, thifluzamide, inpyrfluxam, pyrapropoyne, fluindapyr, methyl (E)-2-[2-[(5-cyano-2-methyl-phenoxy)methyl]phenyl]-3-methoxy-prop-2 enoate, isoflu-cypram, 2-(difluoromethyl)-N-(1,1,3-trimethyl-indan-4 yl)pyridine-3-carboxamide, 2-(difluoromethyl)-N-[(3R)-1,1,3-trimethylindan-4-yl]pyridine-3-carboxamide, 2-(difluoromethyl)-N-(3-ethyl-1,1-dimethyl-indan-4-yl)pyridine-3-carboxamide, 2-(difluoromethyl)-N-[(3R)-3-ethyl-1,1-dimethyl-indan-4-yl]pyridine-3-carboxamide 2-(difluoromethyl)-N-(1,1-dimethyl-3-propyl-indan-4-yl)pyridine-3-carboxamide, 2-(difluoromethy 1)-N-[(3R)-1,1-dimethyl-3-propyl-indan-4-yl] pyridine-3-carboxamide, 2-(difluoromethyl)-N-(3-isobutyl-1,1-dimethyl-indan-4-yl)pyridine-3-carboxamide, or 2-(difluoromethyl)-N-[(3R)-3-isobutyl-1,1-dimethyl-indan-4 yl]pyridine-3-carboxamide, other respiration inhibitors (e.g. diflumetorim, nitrophenyl derivates, binapacryl, dinobuton, dinocap, fluazinam, meptyldinocap, ferimzone, organometal compounds, fentin salts (e. g. fentin-acetate, fentin chloride, or fentin hydroxide), ametoctradin, silthiofam, sterol biosynthesis inhibitors (SBI fungicides), C14 demethylase inhibitors, triazoles, azaconazole, bitertanol, bromu-conazole, cyproconazole, difenoconazole, diniconazole, dinicona-zole-M, epoxiconazole, fenbuconazole, fluquinconazole, flusi-lazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole, 2 (2,4-difluorophenyl)-1,1-difluoro-3-(tetrazol-1-yl)-1-[5-[4-(2,2,2-trifluoroethoxy)phenyl]-2 pyridyl]propan-2-ol, 2-(2,4-difluorophenyl)-1,1-difluoro-3-(tetrazol-1-yl)-1 [5 [4 (trifluoromethoxy)phenyl]-2-pyridyl]propan-2-ol, ipfentrifluconazole, mefentrifluconazole, 2-(chloromethyl)-2-methyl-5-(p-tolylmethyl)-1 (1,2,4-triazol-1 ylmethyl)cyclopentanol, imidazoles, imazalil, pefurazoate, prochloraz, triflumizol, pyrimidines, pyridines, piperazines, fenarimol, pyrifenox, triforine, [3-(4-chloro-2-fluoro-phenyl)-5-(2,4-difluorophenyl)isoxazol-4-yl]-(3-pyridyl)methanol, Delta14-reductase inhibitors, aldimorph, dodemorph, dodemorph-acetate, fenpropimorph, tridemorph, fenpropidin, piperalin, spirox-amine, inhibitors of 3-keto reductase, fenhexamid, other sterol biosynthesis inhibitors, chlorphenomizole, nucleic acid synthesis inhibitors, phenylamides or acyl amino acid fungicides, benalaxyl, benalaxyl-M, kiralaxyl, metalaxyl, metalaxyl-M, ofurace, oxadixyl, other nucleic acid synthesis inhibitors, hymexazole, octhilinone, oxolinic acid, bupirimate, 5-fluorocytosine, 5-fluoro-2-(p-tolylmethoxy)pyrimidin-4 amine, 5-fluoro-2-(4-fluorophenylmethoxy)pyrimidin-4 amine, 5-fluoro-2 (4 chlorophenylmethoxy)pyrimidin-4 amine, inhibitors of cell division and cytoskeleton, tubulin inhibitors, benomyl, carbendazim, fuberidazole, thia-bendazole, thiophanate-methyl, 3-chloro-4-(2,6-difluorophenyl)-6-methyl-5-phenyl-pyridazine, 3-chloro-6-methyl-5-phenyl-4-(2,4,6-trifluorophenyl) pyridazine, N ethyl-2-[(3-ethynyl-8-methyl-6-quinolyl)oxy] butanamide, N-ethyl-2-[(3-ethynyl-8 methyl-6 quinolyl) oxy]-2-methylsulfanyl-acetamide, 2-[(3-ethynyl-8-methyl-6-quinol-yl)oxy]-N (2-fluoroethyl)butanamide, 2-[(3-ethynyl-8-methyl-6-quinolyl)oxy]-N-(2-flu-oroethyl)-2-methoxy-acetamide, 2-[(3-ethynyl-8-methyl-6-quinolyl) oxy]-N-propyl-butanamide, 2-[(3-ethynyl-8-methyl-6-quinolyl)oxy]-2-methoxy-N-propyl-acetamide, 2-[(3-ethynyl-8-methyl-6-quinolyl)oxy]-2-methylsulfanyl-N-propyl-acetamide, 2 [(3 ethynyl-8-methyl-6-quinolyl)oxy]-N-(2-fluoroethyl)-2-methylsulfanyl-acetamide, 4-(2-bromo-4-fluoro-phenyl)-N-(2-chloro-6-fluoro-phenyl)-2,5-dimethyl-pyrazol-3 amine, other cell division inhibitors, diethofencarb, ethaboxam, pencycuron, fluopicolide, zoxamide, metrafenone, pyriofenone, inhibitors of amino acid and protein synthesis, methionine synthesis inhibitors, cyprodinil, mepanipyrim, pyrimethanil, protein synthesis inhibitors, blasticidin-S, kasugamycin, kasugamycin hy-drochloride-hydrate, mildiomycin, streptomycin, oxytetracyclin, signal transduction inhibitors, MAP/histidine kinase inhibitors, fluoroimid, iprodione, procymidone, vinclozolin, fludioxonil, G protein inhibitors, quinoxyfen, lipid and membrane synthesis inhibitors, phospholipid biosynthesis inhibitors, edifenphos, iprobenfos, pyrazophos, isoprothiolane, lipid peroxidation, dicloran, quintozene, tecnazene, tolclofos-methyl, biphenyl, chloroneb, etridiazole, phospholipid biosynthesis and cell wall deposition, dimethomorph, flumorph, mandipropamid, pyrimorph, benthiavalicarb, iprovalicarb, valifenalate, compounds affecting cell membrane permeability and fatty acids, propamocarb, inhibitors of oxysterol binding protein, oxathiapiprolin, 2-{3-[2-(1-{[3,5-bis(difluoro-methyl-1H-pyrazol-1-yl] acetyl}piperidin-4-yl)-1,3-thiazol-4-yl]-4,5-dihydro-1,2 oxazol-5-yl}phenyl methanesulfonate, 2-{3-[2-(1-{[3,5-bis (difluoromethyl)-1H-pyrazol-1-yl]-acetyl}piperidin-4-yl) 1,3-thiazol-4-yl]-4,5-dihydro-1,2-oxazol-5 yl}-3-chlorophenyl methane-sulfonate, 4-[1-[2-[3-(difluoromethyl)-5-methyl-pyrazol-1-yl]acetyl]-4-piperidyl]-N-tetralin-1-yl-pyridine-2-carboxamide, 4-[1-[2-[3,5-bis(difluoromethyl) pyrazol-1-yl]acetyl]-4-piperidyl]-N-tetralin-1-yl-pyridine-2-carboxamide, 4-[1-[2-[3-(difluoromethyl)-5-(trifluoromethyl)pyrazol-1-yl]acetyl]-4-piperidyl]-N-tetralin-1-yl-pyridine-2-carboxamide, 4-[1-[2-[5-cyclopropyl-3-(difluoromethyl)pyrazol-1-yl]acetyl]-4-piperidyl]-N-tetralin-1-yl-pyridine-2-carboxamide, 4-[1-[2-[5-methyl-3-(trifluoromethyl)pyrazol-1-yl]acetyl]-4-piperidyl]-N-tetralin-1-yl-pyridine-2-carboxamide, 4-[1-[2-[5-(difluoromethyl)-3-(trifluoro-methyl)pyrazol-1-yl]acetyl]-4-piperidyl]-N-tetralin-1-yl-pyridine-2-carboxamide, 4 [1 [2-[3,5-bis(trifluoromethyl)pyrazol-1-yl]acetyl]-4-piperidyl]-N-tetralin-1-yl-pyridine-2-carboxamide, (4-[1-[2-[5-cyclopropyl-3-(trifluoromethyl)pyrazol-1-yl]acetyl]-4-piperidyl]-N-tetralin-1-yl-pyridine-2-carboxamide, inhibitors with multi-site action, inorganic active substances, bordeaux mixture, copper, copper acetate, copper hydroxide, copper oxychloride, basic copper sulfate, sul-fur, thio- and dithiocarbamates, ferbam, mancozeb, maneb, metam, metiram, propineb, thiram, zineb, ziram, organochlorine compounds, anilazine, chlorothalonil, captafol, captan, folpet, dichlofluanid, dichlorophen, hexachlorobenzene, pentachlorphenole and its salts, phthalide, tolylfluanid, guanidines and others, guanidine, dodine, dodine free base, guazatine, guazatine-acetate, iminoctadine, iminoctadine-triacetate, iminoctadine-tris(albesilate), dithianon, 2,6-dimethyl-1H,5H-[1,4]di-thiino[2,3-c:5,6-c']dipyrrole-1,3,5,7(2H,6H)-tetraone, cell wall synthesis inhibitors, inhibitors of glucan synthesis, validamycin, polyoxin B, melanin synthesis inhibitors, pyroquilon, tricyclazole, carpropamid, di-cyclomet, fenoxanil, plant defense inducers, acibenzolar-S-methyl, probenazole, isotianil, tiadinil, prohexa-dione-calcium, phosphonates, fosetyl-aluminum, phosphorous acid and its salts, calcium phosphonate, potassium phosphonate, potassium or sodium bicarbonate, 4 cyclopropyl-N-(2,4-dimethoxyphenyl)thiadiazole-5-carboxamide, bronopol, chinomethionat, cyflufenamid, cymoxanil, dazomet, debacarb, diclocymet, diclomezine, difenzoquat, di-fenzoquat-methylsulfate, diphenylamin, fenitropan, fenpyrazamine, flumetover, flusulfamide, flutianil, harpin, metha-sulfocarb, nitrapyrin, nitrothal-isopropyl, tolprocarb, oxin-copper, proquinazid, tebufloquin, tecloftalam, triazoxide, N'-(4-(4-chloro-3-trifluoromethyl-phenoxy)-2,5-dimethyl-phenyl)-N-ethyl-N methyl formamidine, N' (4-(4-fluoro-3-trifluoromethyl-phenoxy)-2,5-dimethyl-phenyl)-N-ethyl-N-methyl formamidine, N'-[4-[[3-[(4-chlorophenyl)methyl]-1,2,4-thiadiazol-5-yl]oxy]-2,5-dimethyl-phenyl]-N-ethyl-N-methyl-formamidine, N'-(5-bromo-6-indan-2-yloxy-2-methyl-3-pyridyl)-N-ethyl-N-methyl-formamidine, N'-[5-bromo-6-[1-(3,5-diflu-orophenyl)ethoxy]-2-methyl-3-pyridyl]-N-ethyl-N-methyl-formamidine, N'-[5-bromo-6-(4-isopropylcyclohexoxy)-2-methyl-3-pyridyl]-N-ethyl-N-methyl-formamidine, N' [5 bromo-2-methyl-6-(1-phenylethoxy)-3-pyridyl]-N-ethyl-N-methyl-formamidine, N'-(2-methyl-5-trifluoromethyl-4-(3-trimethylsilanyl-propoxy)-phenyl)-N-ethyl-N-methyl formamidine, N'-(5-difluoromethyl-2 methyl-4-(3-trimethylsilanyl-propoxy)-phenyl)-N-ethyl-N-methyl formamidine, 2-(4-chloro-phenyl)-N-[4-(3,4-dimethoxy-phenyl)-isoxazol-5 yl]-2-prop-2-ynyloxy-acetamide, 3 [5-(4-chloro-phenyl)-2,3-dimethyl-isoxazolidin-3-yl]-pyridine (pyrisoxazole), 3-[5-(4-methylphenyl)-2,3-dimethyl-isoxazolidin-3 yl]-pyridine, 5-chloro-1 (4,6-dimethoxy-pyrimidin-2-yl)-2-methyl-1H-benzoimidazole, ethyl (Z) 3 amino-2-cyano-3-phenyl-prop-2-enoate, picarbutrazox, pentyl N-[6-[[(Z)-[(1-methyltetrazol-5-yl)-phenyl-methylene]amino]oxymethyl]-2-pyridyl] carbamate, but-3-ynyl N-[6-[[(Z)-[(1-methyltetrazol-5-yl)-phenyl-methylene]amino]oxy methyl]-2-pyridyl]carbamate, 2-[2-[(7,8-difluoro-2-methyl-3-quinolyl)oxy]-6-fluoro-phenyl]propan-2-ol, 2-[2-fluoro-6-[(8-fluoro-2-methyl-3-quinolyl)oxy]phen-yl]propan-2-ol, quinofumelin, 9-fluoro-2,2-dimethyl-5-(3-quinolyl)-3H 1,4 benzoxazepine, 2-(6-benzyl-2-pyridyl)quinazoline, 2-[6-(3-fluoro-4 methoxy-phenyl)-5-methyl-2-pyridyl]quinazoline, dichlobentiazox, N'-(2,5-dimethyl-4-phenoxy-phenyl)-N-ethyl-N-methyl-formamidine, and pyrifenamine.

Still further instances of pesticides include, but are not limited to microbial pesticides with fungicidal, bactericidal, viricidal and/or plant defense activator activity, *Ampelomyces quisqualis, Aspergillus flavus, Aureobasidium pullulans, Bacillus altitudinis, B. amyloliquefaciens, B. megaterium, B. mojavensis, B. mycoides, B. pumilus, B. simplex, B. solisalsi, B. subtilis, B. subtilis* var. *amyloliquefaciens, Candida oleophila, C. saitoana, Clavibacter michiganensis* (bacteriophages), *Coniothyrium minitans, Cryphonectria parasitica, Cryptococcus albidus, Dilophosphora alopecuri, Fusarium oxysporum, Clonostachys rosea f. catenulate* (also named *Gliocladium catenulatum*), *Gliocladium roseum, Lysobacter antibioticus, L. enzymogenes, Metschnikowia fructicola, Microdochium dimerum, Microsphaeropsis ochracea, Muscodor albus, Paenibacillus alvei, Paenibacillus epiphyticus, P. polymyxa, Pantoea vagans, Penicillium bilaiae, Phlebiopsis gigantea, Pseudomonas* sp., *Pseudomonas chloraphis,*

*Pseudozyma flocculosa, Pichia anomala, Pythium oligandrum, Sphaerodes mycoparasitica, Streptomyces griseoviridis, S. lydicus, S. violaceusniger, Talaromyces flavus, Trichoderma asperelloides, T. asperellum, T. atroviride, T. fertile, T. gamsii, T. harmatum, T. harzianum, T. polysporum, T. stromaticum, T. vixens, T. viride, Typhula phacorrhiza, Ulocladium oudemansii, Verticillium dahlia*, zucchini yellow mosaic virus (avirulent strain), biochemical pesticides with fungicidal, bactericidal, viricidal and/or plant defense activator activity, harpin protein, *Reynoutria sachalinensis* extract, microbial pesticides with insecticidal, acaricidal, molluscidal and/or nematicidal activity, *Agrobacterium radiobacter, Bacillus cereus, B. firmus, B. thuringiensis, B. thuringiensis* ssp. *aizawai, B. t. ssp. israelensis, B. t. ssp. galleriae, B. t. ssp. kurstaki, B. t. ssp. tenebrionis, Beauveria bassiana, B. brongniartii, Burkholderia* spp., *Chromobacterium subtsugae, Cydia pomonella granulovirus* (CpGV), *Cryptophlebia leucotreta* granulovirus (CrleGV), *Flavobacterium* spp., *Helicoverpa armigera* nucleopolyhedrovirus (HearNPV), *Helicoverpa zea* nucleopolyhedrovirus (HzNPV), *Helicoverpa zea* single capsid nucleopolyhedrovirus (HzSNPV), *Heterorhabditis bacteriophora, Isaria fumosorosea, Lecanicillium longisporum, L. muscarium, Metarhizium anisopliae, M anisopliae* var. *anisopliae, M anisopliae* var. *acridum, Nomuraea rileyi, Paecilomyces fumosoroseus, P. lilacinus, Paenibacillus popilliae, Pasteuria* spp., *P. nishizawae, P. penetrans, P. ramosa, P. thornea, P. usgae, Pseudomonas fluorescens, Spodoptera littoralis* nucleopolyhedrovirus (SpliNPV), *Steinernema carpocapsae, S. feltiae, S. kraussei, Streptomyces galbus, S. microflavus*, biochemical pesticides with insecticidal, acaricidal, molluscidal, pheromone and/or nematicidal activity, L-carvone, citral, (E,Z)-7,9-dodecadien-1-yl acetate, ethyl formate, (E,Z)-2,4-ethyl decadienoate (pear ester), (Z,Z,E)-7,11,13-hexadecatrienal, heptyl butyrate, isopropyl myristate, lavanulyl senecioate, cis-jasmone, 2-methyl 1-butanol, methyl eugenol, methyl jasmonate, (E,Z)-2,13-octadecadien-1-ol, (E,Z)-2,13-octadecadien-1-ol acetate, (E,Z)-3,13-octadecadien-1-ol, (R)-1-octen-3-ol, pentatermanone, (E,Z,Z)-3,8,11-tetradecatrienyl acetate, (Z,E)-9,12-tetradecadien-1-yl acetate, (Z)-7-tetradecen-2-one, (Z)-9-tetradecen-1-yl acetate, (Z)-11-tetradecenal, (Z)-11-tetradecen-1-ol, extract of *Chenopodium ambrosiodes*, Neem oil, Quillay extract, microbial pesticides with plant stress reducing, plant growth regulator, plant growth promoting and/or yield enhancing activity, *Azospirillum amazonense, A. brasilense, A. lipoferum, A. irakense, A. halopraeferens, Bradyrhizobium* spp., *B. elkanii, B. japonicum, B. liaoningense, B. lupini, Delftia acidovorans, Glomus intraradices, Mesorhizobium* spp., *Rhizobium leguminosarum* bv. *phaseoli*, R. 1. bv. *trifolii*, R. 1. bv. *viciae, R. tropici*, and *Sinorhizobium meliloti.*

Further instances of pesticides can be found in a variety of locations including The Pesticide Manual, 17th Edition, C. MacBean, British Crop Protection Council (2015) (the teachings and contents of which are incorporated by reference herein). The Pesticide Manual is updated regularly and is accessible online at the bcpcdata website.

Another online data base for pesticides providing the ISO common names is found online at the alanwood.net website. In addition to their beneficial use with agrochemicals, the additives of the disclosure are useful wherever polyacrylamide co-polymers are used in that the additives provide a protective effect to the co-polymers. These additives hydrate and surround the longer polyacrylamide co-polymer strands and maintain, preserve, and/or improve their physical properties under shear conditions such that they perform similarly to when not subjected to shear conditions. Those of skill in the art understand that while the longer polyacrylamide strands may still degrade from the shear, the additives of the disclosure will cause the degradation to occur at a slower rate, thereby maintaining, preserving, or improving their physical properties in comparison to polyacrylamide strands that do not have the additive but are subjected to the same shear conditions.

In one aspect, the present disclosure generally provides an additive for water solutions containing at least one hydrated polyacrylamide co-polymer. In preferred forms, the additive is combined with the water solution containing the hydrated polyacrylamide co-polymer prior to the water solution being subjected to shear or high shear conditions.

In some forms, the additive has the generalized formula of Formula 1:

$$R_1—O\text{-}EO_a—PO_b\text{-}EO_b\text{-}PO_d—R_2 \qquad \text{Formula 1:}$$

wherein $R_1$ and $R_2$ are each individually selected from hydrogen or any $C_1$ to $C_{18}$ carbon or carbon chain; O is oxygen, $EO_a$ is $(CH_2CH_2—O)_a$ where a can be from 0-500; $PO_b$ is $(CH(CH_3)CH_2—O)_b$ where b can be from 0-70; $EO_c$ is $(CH_2CH_2—O)$, where c can be from 0-150; $PO_d$ is $—CH(CH_3)CH_2—O)_d$ where d is from 0-30; and wherein Formula 1 has a minimum molecular weight of 350 wherein the molecular weight (as well as all other molecular weights referred to in the disclosure herein) is reported as a calculated weight averaged molecular weight. Preferably, the molecular weight of the additive in this form is between 350-22,000, more preferably between 365-20,000, still more preferably between 375-16,000, even more preferably between 385-12,000, and still more preferably between 400-8,000. As would be understood by those of skill in the art, a, b, c and d in Formula 1 represent the average number of repeating units. Those skilled in the art know that the products of alkoxylation are a distribution of oligomers.

In some forms, the additive is a tetra functional block co-polymer. Preferably, the tetra functional block co-polymer is based on ethylene oxide and propylene oxide. Some representative tetra functional block co-polymers are initiated with ethylene diamine. In some forms, the tetra functional block co-polymers are available as TETRONIC® (BASF Corporation, Florham Park, N.J.) products. Molecular weights of additives comprising tetra functional block co-polymers can range from 400-30,000 with some common ranges being between 500-25,000, 700-20,000, 800-15,000, 900-10,000, and 1,000-8,000. In some forms, the ranges are similar to those described above for Formula 1. Some specific examples have molecular weights of 1650 and 6800.

In some forms, the additive is a polyvinylpyrrolidone homopolymer (hereinafter "PVP"). Preferably, the PVP has a molecular weight between 2,000-180,000. For example, PVP having molecular weights of 2,000, 4,000, 8,000, 10,000, 12,000, 17,000, 20,000, 24,000, 30,000, 34,000, 40,000, 45,000, 50,000, 55,000, 60,000, 65,000, 70,000, 75,000, 80,000, 85,000, 90,000, 100,000, 110,000, 120,000, 130,000, 140,000, 150,000, 160,000, 170,000, 180,000 and all ranges and number between such examples. Some examples of PVP include the SOKALAN® (BASF Corporation) products.

The additives of the present disclosure can be mixed together in any combination. For example, the additive may comprise:

A) at least one Formula I additive;

B) at least one tetra functional block co-polymer additive;

C) at least one PVP additive; and

D) any combination thereof.

Thus, a composition may comprise one or more Formula 1 additives, and/or one or more tetra functional block co-polymer additives, and/or one or more PVP additives, or any mixture thereof.

Generally, the total amount of additive is present in an amount from 0.001% to 40% by weight of the composition. More preferably, the additive is present in an amount from 0.002% to 30% by weight, still more preferably in an amount from 0.003 to 20%, even more preferably in an amount between 0.004 to 10%, still more preferably between 0.005 to 8%, even more preferably between 0.006 to 6%, still more preferably between 0.007 to 4%, even more preferably between 0.008 to 3%, still more preferably between 0.009 to 2%, still more preferably between 0.01 to 1%, even more preferably between 0.01 and 0.5%, and still more preferably between 0.01 and 0.25%. It is understood that the amount of additive is dependent on the type of additive as well as the composition and/or the hydrated polyacrylamide co-polymer water solution with which it will be combined. When the additive has the formula $R_1$—O-$EO_a$—$PO_b$-$EO_c$-$PO_d$—$R_2$ as described above or is a tetra functional block co-polymer, some preferred concentrations include 0.05%, 0.1%, 0.125%, 0.25%, 0.3%, 0.35%, 0.4%, 0.45%, and 0.5%. When the additive is PVP, some preferred concentrations are less than 0.5%, less than 0.4%, less than 0.3%, less than 0.2%, less than 0.1%, and even less than 0.05%.

It is understood that all percentages and amounts in the disclosure herein refer to the amount of the component in the final solution that is sprayed on the intended target.

Generally, the hydrated polyacrylamide co-polymer is included in an amount commonly used in agricultural applications. Preferably, the hydrated polyacrylamide co-polymer is included in an amount from 10 ppm to 200 ppm, more preferably from 20 ppm to 180 ppm, still more preferably from 30 ppm to 160 ppm, even more preferably from 40 ppm to 140 ppm, still more preferably from 45 ppm to 120 ppm, and most commonly from 50 ppm to 100 ppm. All amounts refer to the concentration in the solution sprayed on the intended target.

Generally, the water solution is included in an amount from 60% v/v to 99.5% v/v, more preferably from 70% v/v to 99.5% v/v, even more preferably from 80% v/v to 99.5% v/v, still more preferably 90% v/v to 99.5% v/v, or 90% v/v, 91% v/v, 92% v/v, 93% v/v, 94% v/v, 95% v/v, 96% v/v, 97% v/v, 98% v/v, 99% v/v, or 99.5% v/v.

In another aspect, a composition of the present disclosure comprises at least one additive as described above, at least one hydrated polyacrylamide co-polymer, and a water solution containing at least one pesticide. Generally, the pesticide is included in an amount from 0.001% wt/wt to 50% wt/wt, more preferably from 0.01% wt/wt to 40% wt/wt, even more preferably 0.025% wt/wt to 30% wt/wt, still more preferably from 0.05% wt/wt to 20% wt/wt, even more preferably 0.075% wt/wt to 10% wt/wt, more preferably 0.1% wt/wt to 7% wt/wt, even more preferably 0.25% wt/wt to 5% wt/wt, and most commonly 0.5% wt/wt to 3% wt/wt.

In another aspect, a method for forming a composition for reducing the effects of shear on a hydrated polyacrylamide co-polymer is provided. The method generally comprises the steps of combining an additive as described herein with a water solution containing a hydrated polyacrylamide co-polymer to form such a composition. The water containing the hydrated polyacrylamide co-polymer can further comprise at least one pesticide. The effects of shear on hydrated polyacrylamide can be determined by comparing droplet size distribution of the hydrated polyacrylamide co-polymer with an additive as described herein and without an additive as described herein. Advantageously, droplet size distribution is more stable when the additive is combined with the hydrated polyacrylamide co-polymer, wherein "more stable" refers to the effect that the droplet size distribution increases at a faster rate for the compositions that do not include the additive. Thus, when the additive is combined with the pesticide solution and a hydrated polyacrylamide co-polymer, the droplet size distribution still increases in the breadth of the range, but at a slower rate than when the additive is not present in the composition.

In another aspect, a method and/or composition for reducing the effects of shear on a hydrated polyacrylamide co-polymer is provided. The method generally comprises the steps of forming a composition by combining an additive as described herein with a water solution containing a hydrated polyacrylamide co-polymer and thereafter subjecting the composition formed thereby to shear conditions. In some forms, the water solution containing the hydrated polyacrylamide co-polymer can further comprise at least one pesticide. In some forms, the reduced effects of shear on the hydrated polyacrylamide co-polymer can be determined by increased or maintained stability in the droplet size formed under shear conditions, wherein such increased or maintained stability refers to a slower rate of degradation in comparison to a hydrated polyacrylamide co-polymer that is not combined with an additive as described herein. Advantageously, the method and composition reduces the effect of the shear conditions that decrease the droplet size and thereby increase the drift of the desired components of the solution. Such an effect is attributed to the increased stability of the hydrated polyacrylamide co-polymer due to the addition of the additive. In some forms, the hydrated polyacrylamide co-polymer(s) is used as an anti-drift or drift reduction agent.

In another aspect, a method and/or composition for stabilizing the interaction of the long strands of a hydrated polyacrylamide co-polymer in a water solution subjected to shear conditions is provided. The method generally comprises the steps of forming a composition by combining an additive as described herein with a water solution containing a hydrated polyacrylamide co-polymer and thereafter subjecting the composition formed thereby to shear conditions. In some forms, the water solution containing the hydrated polyacrylamide co-polymer can further comprise at least one pesticide. In some forms, the stabilization of the interaction of the long strands of the hydrated polyacrylamide co-polymer can be determined by increased or maintained stability in the droplet size formed under shear conditions, wherein such increased or maintained stability refers to a slower rate of degradation in comparison to a hydrated polyacrylamide co-polymer that is not combined with an additive as described herein. Advantageously, the method and composition reduces the effect of the shear conditions that decrease the droplet size and thereby increase the drift of the desired components of the solution. Such an effect is attributed to the increased stability due to the addition of the additive to the hydrated polyacrylamide co-polymer(s). In some forms, the hydrated polyacrylamide co-polymer(s) is used as an anti-drift or drift reduction agent.

In the present disclosure, "co-polymer" and "copolymer" are synonymous.

In the present disclosure, "water solution" refers to plain water or a solution that contains water.

All drift efficacy testing was done in conformance with the U.S. E.P.A. Generic Verification Protocol for Testing Pesticide Application Spray Drift Reduction Technologies for Row and Field Crops as set forth in the June, 2016 Final Generic Verification Protocol for Pesticide Spray DRT.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

DETAILED DESCRIPTION

The following detailed description and examples set forth preferred materials and procedures used in accordance with the present disclosure. It is to be understood, however, that this description and these examples are provided by way of illustration only, and nothing therein shall be deemed to be a limitation upon the overall scope of the present disclosure.

EXAMPLE 1

Materials and Methods

Figure 1:
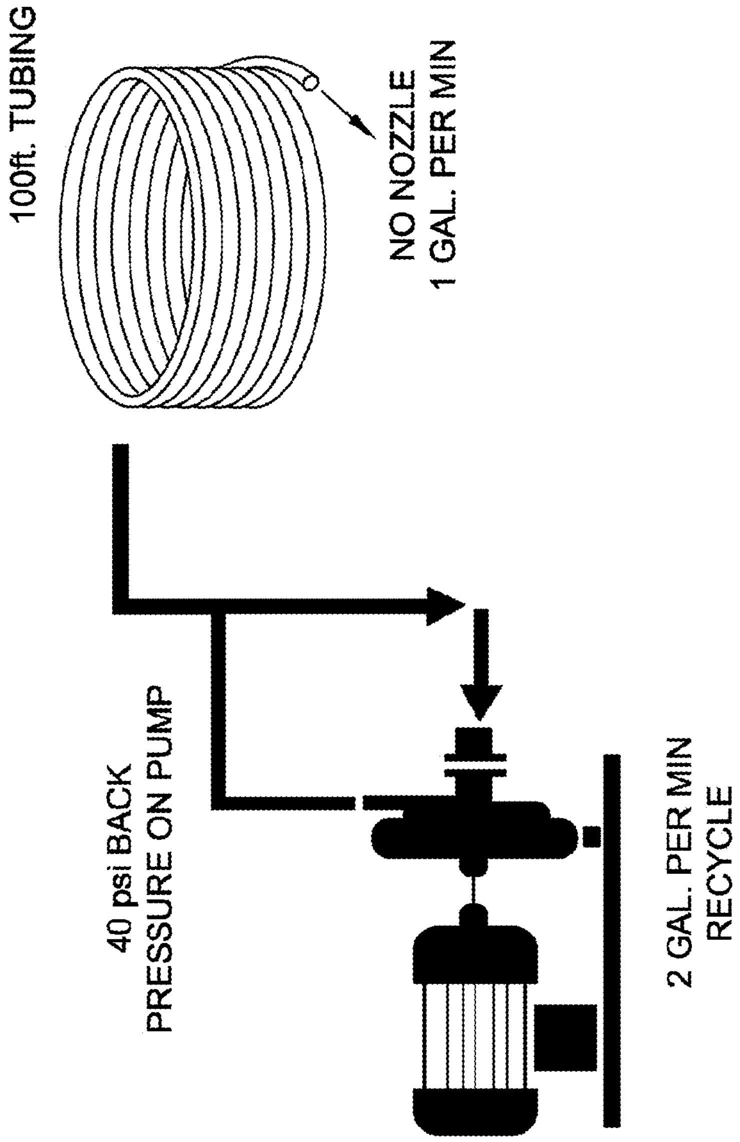
FIG. 1 is a schematic drawing of a pump system used for testing compositions of the present disclosure. The system was designed to provide 40 psi back pressure to a 5 inch centrifugal pump (note the holding tank is not represented in the diagram). The apparatus uses a long length of tubing to provide sliding friction that creates the back pressure of 40 psi on the pump without the added shear of the nozzle. The output is 1 gallon per minute out of the end of the hose and 2 gallons per minute bypass (recycle). The only nozzle involved in the shear is the nozzle atomizing for sizing in the spray cabinet (a TeeJet XR8002VS or TeeJet TTI11004 (TeeJet® Technologies, Glendale Heights, Ill.))

This example tests the effect of 3 different products, Shear Additive 1 (SA1), Shear Additive 2 (SA2), and Shear Additive 3 (SA3) at a 0.25% inclusion level with the pesticide solution PS1 and with or without 2 different hydrated polyacrylamide co-polymers, CP1 and CP2 when cycled multiple times through the pump system of FIG. 1 and subsequently sprayed through the XR8002VS (TeeJet Technologies) nozzle for droplet analysis. The parameters and results of this example are provided below in Table 1 and in FIG. 2.

TABLE 1

| Additive | Conc. | Polymer | Conc. PPM | Pesticide | Conc. | Nozzle | psi | Starting % V < 141 μ | Pump Passes | Final V % < 141 μ | ΔV % |
|---|---|---|---|---|---|---|---|---|---|---|---|
| None | — | None | — | PS1 | 1.70% | XR8002VS | 45 | 55 | 10 | 55 | 0 |
| None | — | CP1 | 50 | PS1 | 1.70% | XR8002VS | 45 | 22 | 10 | 43 | 21 |
| None | — | CP2 | 50 | PS1 | 1.70% | XR8002VS | 45 | 13 | 10 | 41 | 28 |
| SA1 | 0.25% | CP2 | 50 | PS1 | 1.70% | XR8002VS | 45 | 9 | 10 | 22 | 13 |
| SA1 | 0.25% | CP1 | 50 | P51 | 1.70% | XR8002VS | 45 | 14 | 10 | 29 | 15 |
| SA1 | 0.25% | CP1 | 50 | P51 | 1.70% | XR8002VS | 45 | 9 | 10 | 22 | 13 |

| | R1—O R1 | —(CH2CH2—O)$_a$ EO a a = | —(CH(CH3)CH2—O)$_b$ PO b b = | —(CH2CH2—O)$_c$ EO c c = | —(CH(CH3)CH2—O)$_d$ PO d d = | —R2 R2 | ave MW | method |
|---|---|---|---|---|---|---|---|---|
| SA1 | H | 9 | 0 | 0 | 0 | H | 400 | calculated |
| SA2 | H | 33 | 0 | 0 | 0 | H | 1450 | calculated |
| SA3 | H | 182 | 0 | 0 | 0 | H | 8000 | calculated |

Results

Figure 2:
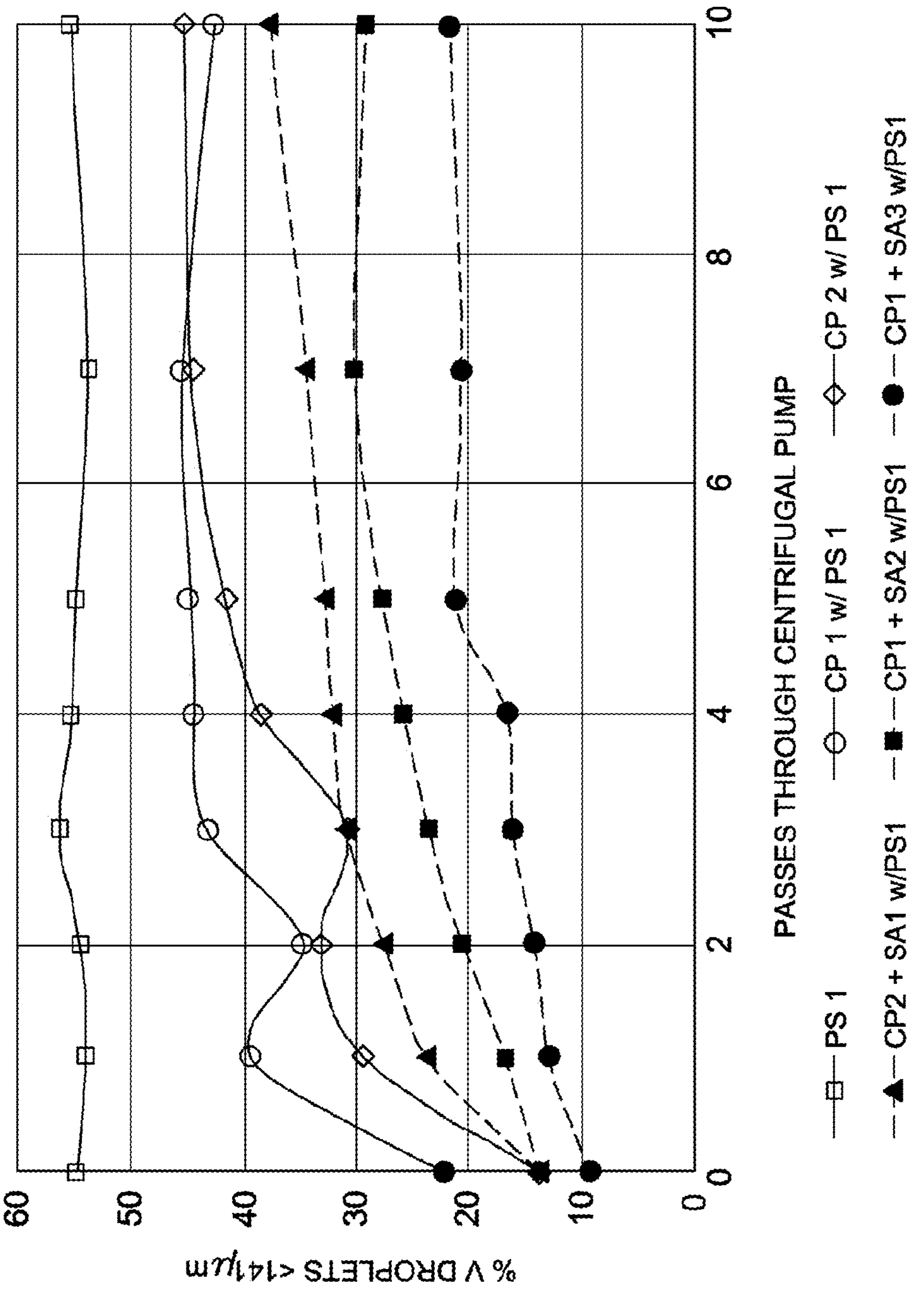
FIG. 2 is a graph illustrating the results of Example 1 which demonstrates the effect of 3 different polyethylene glycol products having average molecular weights of 400 (“Shear Additive 1” or “SA1”), 1450 (“Shear Additive 2” or “SA2”), and 8000 (“Shear Additive 3” or “SA3”) at a 0.25% inclusion level with a 1.7% v/v solution of a 48.7% potassium glyphosphate herbicide formulation (“PS1”) such as the pesticide solution ROUNDUP POWERMAX® (Bayer Crop Science, Research Triangle Park, N.C. (formerly Monsanto, St. Louis, Mo.)) and with or without 2 different hydrated polyacrylamide co-polymers, 1) 50 ppm of a co-polymer comprised of acrylamide monomer, AMPS (2-Acrylamido-2-Methylpropane sulfonic acid) monomer and a hydrophobic monomer as described in CA 2892689A1 (BASF SE) (“Polymer C” or “CP1”), and 2) 50 ppm of a high molecular weight nonionic polyacrylamide (“CP2”) when cycled multiple times through the pump system of FIG. 1 and subsequently sprayed through the XR8002VS (TeeJet Technologies) nozzle for droplet analysis.

As shown by the data, compositions incorporating CP1 experienced a 21% change in droplet size after 10 passes through the pump system when no additive was included compared to a 15% change and a 13% change when 0.25% of SA2 or SA3, respectively, was included. Similarly, compositions incorporating CP2 experienced a 28% change in droplet size with no additive and only a 13% change when 0.25% of SA1 was included. FIG. 2 illustrates that the compositions containing an additive experienced less variation in droplet size as evidenced by the lower percentage of droplets that had a volume less than 141 μm at each successive pass through the pump system. Droplet size of the pesticide solution alone (with no additives) was unaffected by the shear conditions.

EXAMPLE 2

Materials and Methods

This example demonstrates the effect of 3 different products, SA4, SA5, and SA6 at 2 different inclusion levels (0.25% for SA4 and SA5, 0.05% for SA6) with the pesticide solution PS1 and with the CP1 co-polymer when cycled multiple times through the pump system of FIG. 1 and subsequently sprayed through the XR8002VS (TeeJet Technologies) nozzle for droplet analysis. The parameters and results of this example are provided below in Table 2 and in FIG. 3.

TABLE 2

| Shear Additive | Conc. | Polymer | Conc. PPM | Pesticide | Nozzle | psi | Starting % V < 141 μ | Pump Passes | Final V % < 141 μ | ΔV % |
|---|---|---|---|---|---|---|---|---|---|---|
| None | — | None | — | PS 1 | XR8002VS | 45 | 55 | 10 | 55 | 0 |
| None | — | CP 1 | 50 | PS 1 | XR8002VS | 45 | 22 | 10 | 43 | 21 |
| SA 4 | 0.25% | CP 1 | 50 | PS 1 | XR8002VS | 45 | 8 | 10 | 16 | 8 |
| SA 5 | 0.25% | CP 1 | 80 | PS 1 | XR8002VS | 45 | 7 | 5 | 25 | 18 |
| SA 6 | 0.05% | CP 1 | 50 | PS 1 | XR8002VS | 45 | 12 | 3 | 38 | 26 |

| Polypropylene Glycols | R1—O R1 | —(CH2CH2—O)$_a$ EO a a = | —(CH(CH3)CH2—O)$_b$ PO b b = | —(CH2CH2—O)$_c$ EO c c = | —(CH(CH3)CH2—O)$_d$ PO d d = | R2 | —R2 ave MW | method |
|---|---|---|---|---|---|---|---|---|
| SA 4 | H | 0 | 7 | 0 | 0 | H | 425 | calculated |
| SA 5 | H | 0 | 17 | 0 | 0 | H | 1000 | calculated |
| SA 6 | H | 0 | 35 | 0 | 0 | H | 2000 | calculated |

Results

Figure 3:
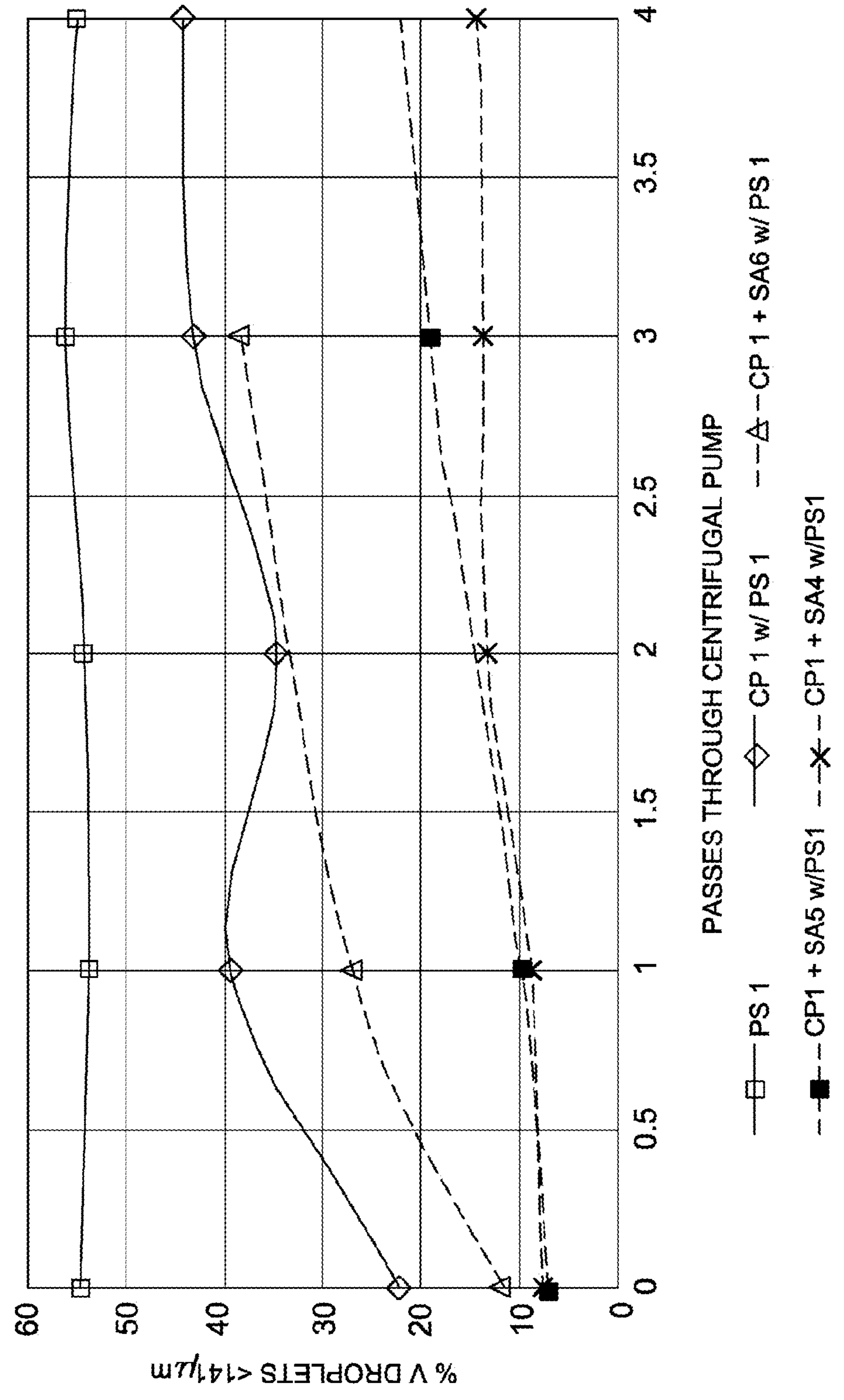
FIG. 3 is a graph illustrating the results of Example 2, which demonstrates the effect of 3 different polypropylene glycol products, SA4, SA5, and SA6 at 2 different inclusion levels (0.25% for SA4 and SA5, 0.05% for SA6) with the pesticide solution PS1 and with the CP1 co-polymer when cycled multiple times through the pump system of FIG. 1 and subsequently sprayed through the XR8002VS (TeeJet Technologies) nozzle for droplet analysis.

As shown by the data and FIG. 3, compositions incorporating CP1 experienced a 21% change in droplet size after 10 passes through the pump system when no additive was included compared to an 8% change when 0.25% of SA4 was included. When the concentration of CP1 was increased to 1%, there was still just an 18% change after 5 pump passes. When the concentration of SA6 was decreased to 0.05%, there was just a 26% change after 3 pump passes. FIG. 3 also illustrates that the compositions containing an additive experienced less variation in droplet size as evidenced by the lower percentage of droplets that had a volume less than 141 μm at each successive pass through the pump system. Droplet size of the pesticide solution alone was unaffected by the shear conditions.

EXAMPLE 3

Materials and Methods

This example tests the effects of 3 different products, SA7, SA8, and SA9 at a 0.25% inclusion level with the PS1 and with the CP1 hydrated polyacrylamide co-polymers when cycled multiple times through the pump system of FIG. 1 and subsequently sprayed through the XR8002VS (TeeJet Technologies) nozzle for droplet analysis. The parameters and results of this example are provided below in Table 3 and in FIG. 4.

TABLE 3

| Shear Additive | Conc. | Polymer | Conc. PPM | Pesticide | Nozzle | psi | Starting % V < 141 μ | Pump Passes | Final V % < 141 μ | ΔV % |
|---|---|---|---|---|---|---|---|---|---|---|
| None | — | None | — | PS 1 | XR8002VS | 45 | 55 | 10 | 55 | 0 |
| None | — | CP 2 | 50 | PS 1 | XR8002VS | 45 | 13 | 10 | 45 | 28 |
| SA 7 | 0.25% | CP 2 | 50 | PS 1 | XR8002VS | 45 | 10 | 10 | 31 | 21 |
| SA 8 | 0.25% | CP 2 | 50 | PS 1 | XR8002VS | 45 | 9 | 10 | 28 | 19 |
| SA 9 | 0.25% | CP 2 | 50 | PS 1 | XR8002VS | 45 | 14 | 10 | 41 | 27 |

| EO/PO Block Polymers | R1—O R1 | —(CH2CH2—0)$_a$ EO a a = | —(CH(CH3)CH2—O)$_b$ PO b b = | —(CH2CH2—O)$_c$ EO c c = | —(CH(CH3)CH2—O)$_d$ PO d d = | —R2 R2 | ave MW | method |
|---|---|---|---|---|---|---|---|---|
| SA 7 | H | 11 | 16 | 11 | 0 | H | 1900 | calculated |
| SA 8 | H | 6.5 | 22 | 6.5 | 0 | H | 1850 | calculated |
| SA 9 | H | 133 | 50 | 133 | 0 | H | 14600 | calculated |

Results

Figure 4:
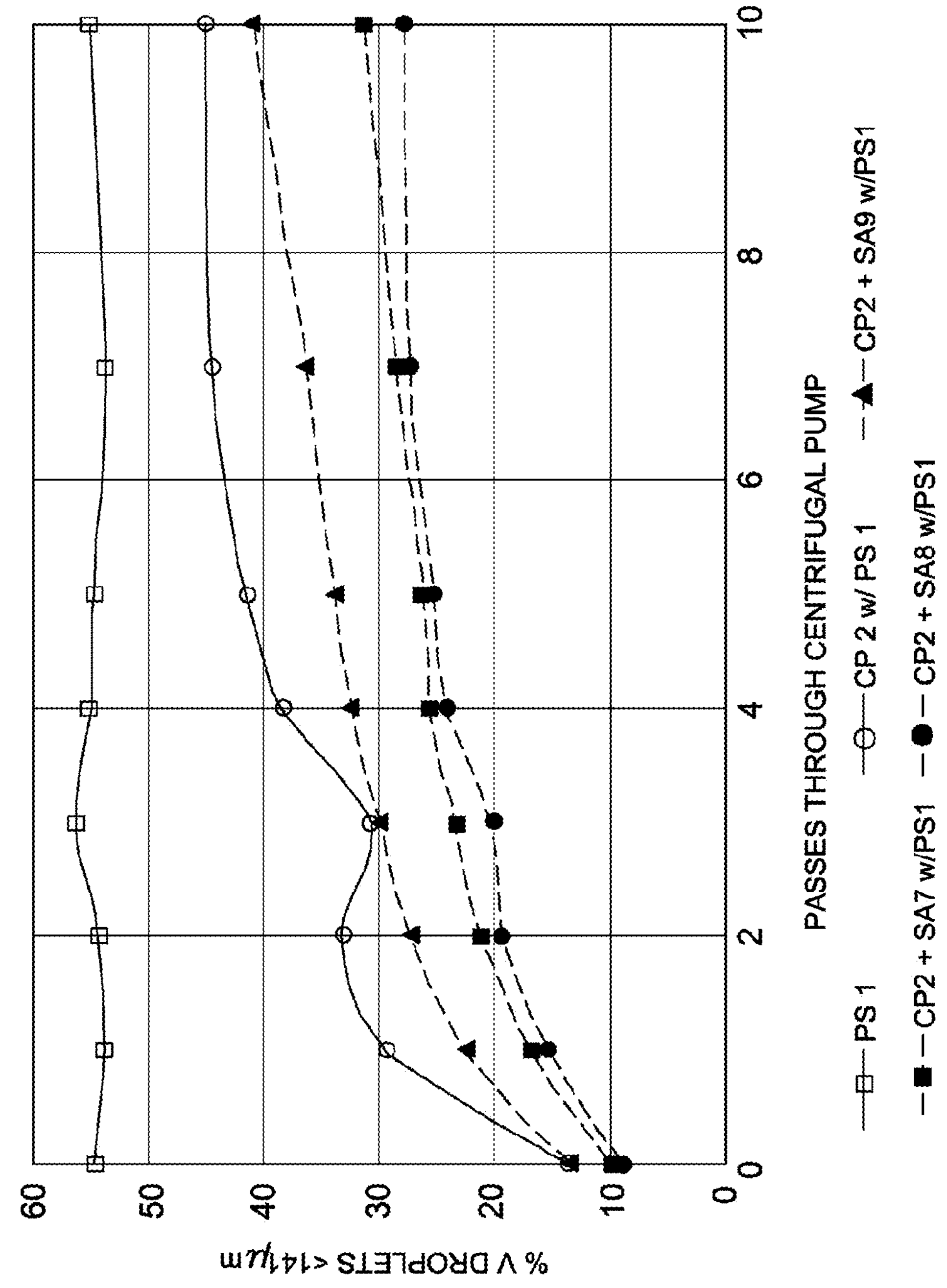
FIG. 4 is a graph illustrating the results of Example 3 which demonstrates the effect of 3 different ethylene oxide propylene oxide block co-polymer products, SA7, SA8, and SA9 at a 0.25% inclusion level with the PS1 pesticide solution and with or without the CP2 hydrated polyacrylamide co-polymer when cycled multiple times through the pump system of FIG. 1 and subsequently sprayed through the XR8002VS (TeeJet Technologies) nozzle for droplet analysis.

As shown by the data and FIG. 4, compositions incorporating Polymer CP2 experienced a 28% change in droplet size after 10 passes through the pump system when no additive was included compared to a 21%, 19%, and 27% change when 0.25% of SA7, SA8, or SA9, respectively was included. FIG. 4 illustrates that the compositions containing an additive experienced less variation in droplet size as evidenced by the lower percentage of droplets that had a volume less than 141 μm at each successive pass through the pump system. Droplet size of the PS1 pesticide solution alone was unaffected by the shear conditions.

EXAMPLE 4

Materials and Methods

This example demonstrates the effect of 3 different Methoxy Polyethylene Glycols, SA10, SA11, and SA12, at a 0.25% inclusion level with the PS1 pesticide solution and with or without a copolymer of acrylamide monomer and AMPS (2-Acrylamide-2-Methylpropane sulfonic Acid) monomer ("CP3") at 1 concentration when cycled multiple times through the pump system of FIG. 1 and subsequently sprayed through the TTI1104XR8002VS (TeeJet Technologies) nozzle for droplet analysis. The parameters and results of this example are provided below in Table 4 and in FIG. 5.

TABLE 4

| Shear Additive | Conc. | Polymer | Conc. PPM | Pesticide | Nozzle | psi | Starting % V < 141 μ | Pump Passes | Final V % < 141 μ | ΔV % |
|---|---|---|---|---|---|---|---|---|---|---|
| None | — | None | — | PS 1 | TTI 11004 | 63 | 2.25 | 3 | 2.25 | 0 |
| None | — | CP 3 | 50 | PS 1 | TTI 11004 | 63 | 1.83 | 3 | 2.01 | 0.18 |
| SA 10 | 0.25% | CP 3 | 50 | PS 1 | TTI 11004 | 63 | 2.18 | 3 | 2.16 | −0.02 |
| SA 11 | 0.25% | CP 3 | 50 | PS 1 | TTI 11004 | 63 | 2.09 | 3 | 1.29 | −0.8 |
| SA 12 | 0.25% | CP 3 | 50 | PS 1 | TTI 11004 | 63 | 1.72 | 3 | 1.79 | 0.07 |

| Methoxy Polyethylene Glycols | R1—O R1 | —(CH2CH2—O)$_a$ EO a a = | —(CH(CH3)CH2—O)$_b$ PO b b = | —(CH2CH2—O)$_c$ EO c c = | —(CH(CH3)CH2—O)$_d$ PO d d = | R2 —R2 | ave MW | method |
|---|---|---|---|---|---|---|---|---|
| SA 10 | CH3 | 11 | 0 | 0 | 0 | H | 550 | calculated |
| SA 11 | CH3 | 7 | 0 | 0 | 0 | H | 350 | calculated |
| SA 12 | CH3 | 5 | 0 | 0 | 0 | H | 250 | calculated |

Results

Figure 5:
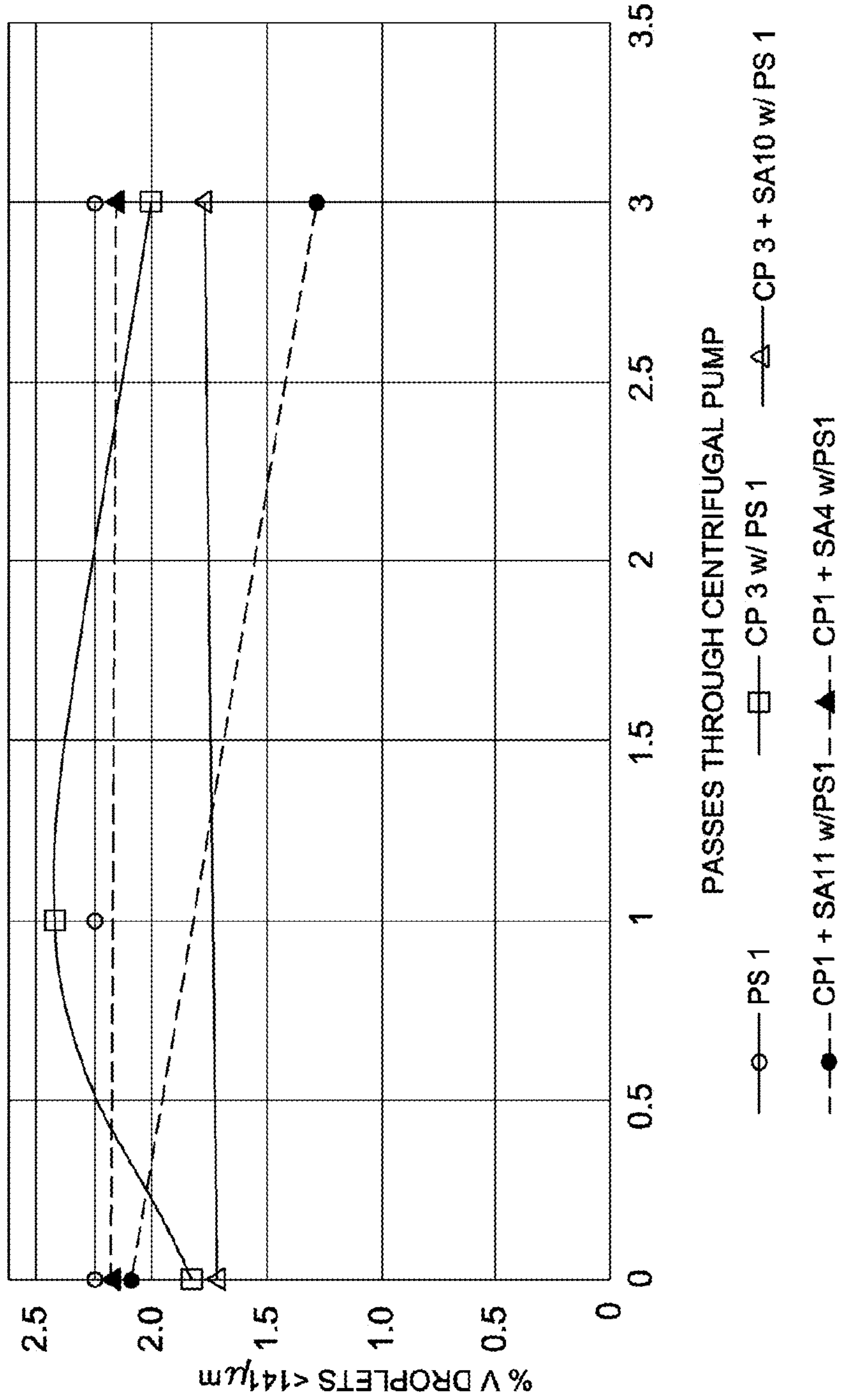
FIG. 5 is a graph illustrating the results of Example 4 which demonstrates the effect of 3 different Methoxy Polyethylene Glycols, SA10, SA11, and SA12, at a 0.25% inclusion level with the PS1 pesticide solution and with or without 50 ppm of a copolymer of acrylamide monomer and AMPS (2-Acrylamide-2-Methylpropane sulfonic Acid) monomer (“CP3”) at 1 concentration when cycled multiple times through the pump system of FIG. 1 and subsequently sprayed through the TTI11004 nozzle (TeeJet Technologies) for droplet analysis.

As shown by the data and FIG. 5, compositions incorporating CP3 experienced a 0.18% change in droplet size after 3 passes through the pump system with no additive and a −0.02%, −0.8%, and 0.07% change when 0.25% of SA10, SA11, and SA12, respectively was included. FIG. 5 also illustrates that the compositions containing an additive experienced less variation in droplet size as evidenced by the lower percentage of droplets that had a volume less than 141 μm at each successive pass through the pump system. Droplet size of the PS1 pesticide solution alone was unaffected by the shear conditions.

EXAMPLE 5

Materials and Methods

This example tests the effects of 5 different Alcohol Alkoxylates, SA13, SA14, SA15, SA16, and SA17, at a 0.25% inclusion level with the PS1 pesticide solution and with or without the CP1 co-polymer when cycled through the pump system of FIG. 1 and subsequently sprayed through the XR8002VS (TeeJet Technologies) nozzle for droplet analysis. The parameters and results of this example are provided in Table 5 and FIG. 6.

TABLE 5

| Shear Additive | Conc. | Polymer | Conc. PPM | Pesticide | Nozzle | psi | Starting % V < 141 μ | Pump Passes | Final V % < 141 μ | ΔV % |
|---|---|---|---|---|---|---|---|---|---|---|
| None | — | None | — | PS 1 | XR8002VS | 45 | 55 | 10 | 55 | 0 |
| None | — | CP 1 | 50 | PS 1 | XR8002VS | 45 | 22 | 10 | 43 | 21 |
| SA 13 | 0.25% | CP 1 | 50 | PS 1 | XR8002VS | 45 | 10 | 3 | 31 | 21 |
| SA 14 | 0.25% | CP 1 | 50 | PS 1 | XR8002VS | 45 | 12 | 3 | 31 | 19 |
| SA 15 | 0.25% | CP 1 | 50 | PS 1 | XR8002VS | 45 | 7 | 3 | 24 | 17 |
| SA 16 | 0.25% | CP 1 | 50 | PS 1 | XR8002VS | 45 | 7 | 3 | 19 | 12 |
| SA 17 | 0.25% | CP 1 | 50 | PS 1 | XR8002VS | 45 | 7 | 3 | 16 | 9 |

| Alcohol Alkoxylates | R1—O R1 | —(CH2CH2—O)$_a$ EO a a = | —(CH(CH3)CH2—O)$_b$ PO b b = | —(CH2CH2—O)$_c$ EO c c = | —(CH(CH3)CH2—O)$_d$ PO d d = | —R2 R2 | ave MW | method |
|---|---|---|---|---|---|---|---|---|
| SA 13 | C6C10 | 0 | 3 | 17.8 | 7.5 | H | 1500 | calculated |
| SA 14 | C10 | 5.7 | 4.7 | 2.3 | 0 | H | 773 | calculated |
| SA 15 | C10 | 5.7 | 4.7 | 0.3 | 0 | H | 685 | calculated |
| SA 16 | C12C15 | 9.9 | 4.9 | 0 | 0 | H | 917 | calculated |
| SA 17 | C13C15 | 12 | 6 | 0 | 0 | H | 1078 | calculated |

Results

Figure 6:
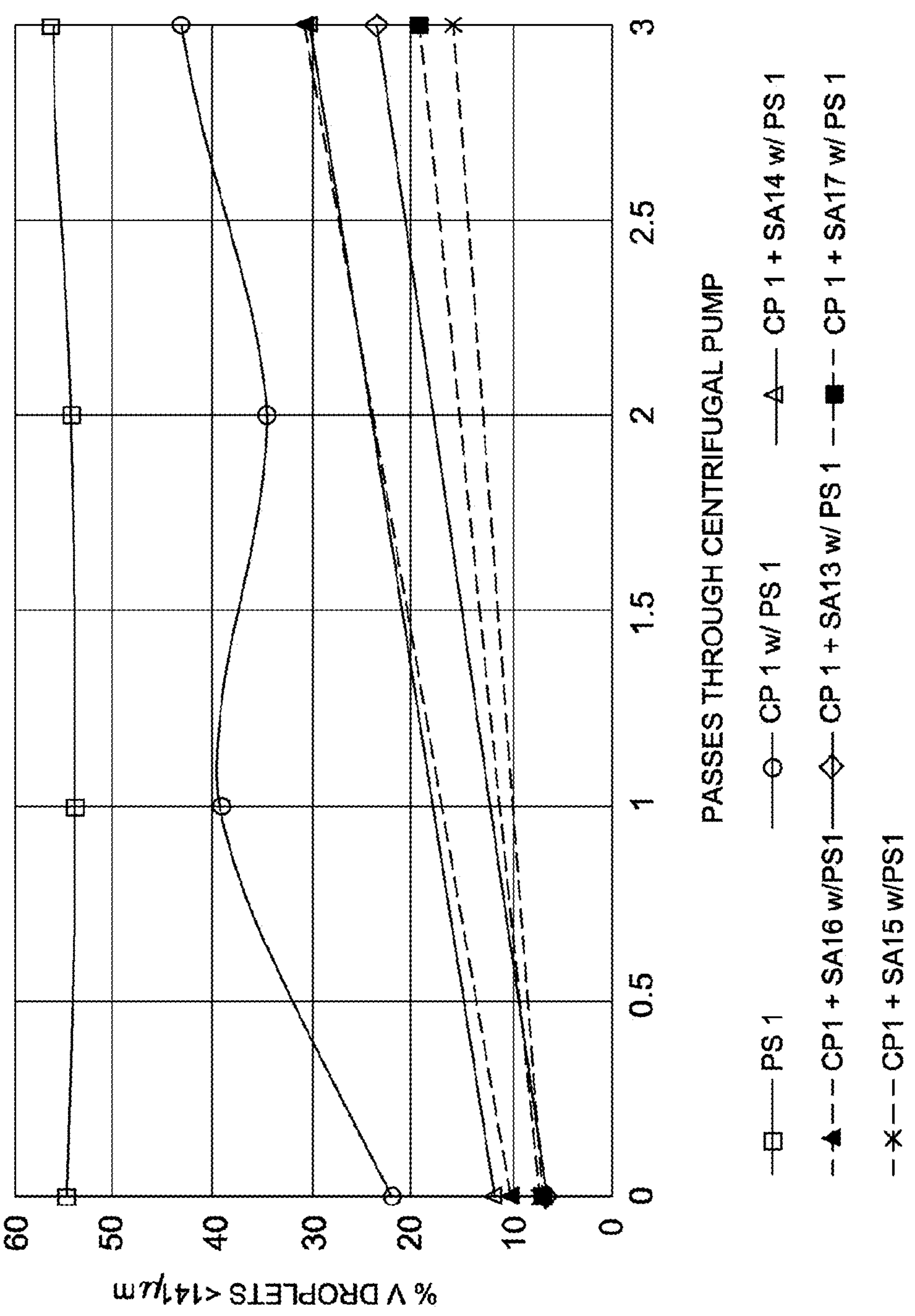
FIG. 6 is a graph illustrating the results of Example 5 which demonstrates the effect of 5 different Alcohol Alkoxylates, SA13, SA14, SA15, SA16, and SA17 at a 0.25% inclusion level with the PS1 pesticide solution and with or without the hydrated polyacrylamide co-polymer Polymer CP1 at 1 concentration when cycled multiple times through the pump system of FIG. 1 and subsequently sprayed through the XR8002VS (TeeJet Technologies) nozzle for droplet analysis.

As shown by the data and FIG. 6, compositions incorporating CP1 experienced a 21% change in droplet size after 10 passes through the pump system with no additive and a 21%, 19%, 17%, 12%, and 9% change when 0.25% of SA13, SA14, SA15, SA16, and SA17, respectively, was included. FIG. 6 also illustrates that the compositions containing an additive experienced less variation in droplet size as evidenced by the lower percentage of droplets that had a volume less than 141 μm at each successive pass through the pump system. Droplet size of the PS1 pesticide solution alone was unaffected by the shear conditions.

EXAMPLE 6

Materials and Methods

This example tests the effects of 2 different tetra functional block copolymers at a 0.25% inclusion level with the PS1 pesticide solution and with or without the hydrated polyacrylamide co-polymer CP1 at 1 concentration when cycled multiple times through the pump system of FIG. 1 and subsequently sprayed through the XR8002VS (TeeJet Technologies) nozzle for droplet analysis. The parameters and results of this example are provided below in Table 6 and in FIG. 7.

TABLE 6

| Shear Additive | Conc. | Polymer | Conc. PPM | Pesticide | Nozzle | psi | Starting % V < 141 μ | Pump Passes | Final V % < 141 μ | ΔV % |
|---|---|---|---|---|---|---|---|---|---|---|
| None | — | None | — | PS 1 | XR8002VS | 45 | 55 | 10 | 55 | 0 |
| None | — | CP 1 | 50 | PS 1 | XR8002VS | 45 | 22 | 10 | 43 | 21 |
| Tetronic ® 304 | 0.25% | CP 1 | 50 | PS 1 | XR8002VS | 45 | 10 | 3 | 22 | 12 |
| Tetronic ® 1301 | 0.25% | CP 1 | 50 | PS 1 | XR8002VS | 45 | 12 | 3 | 32 | 20 |

Results

Figure 7:
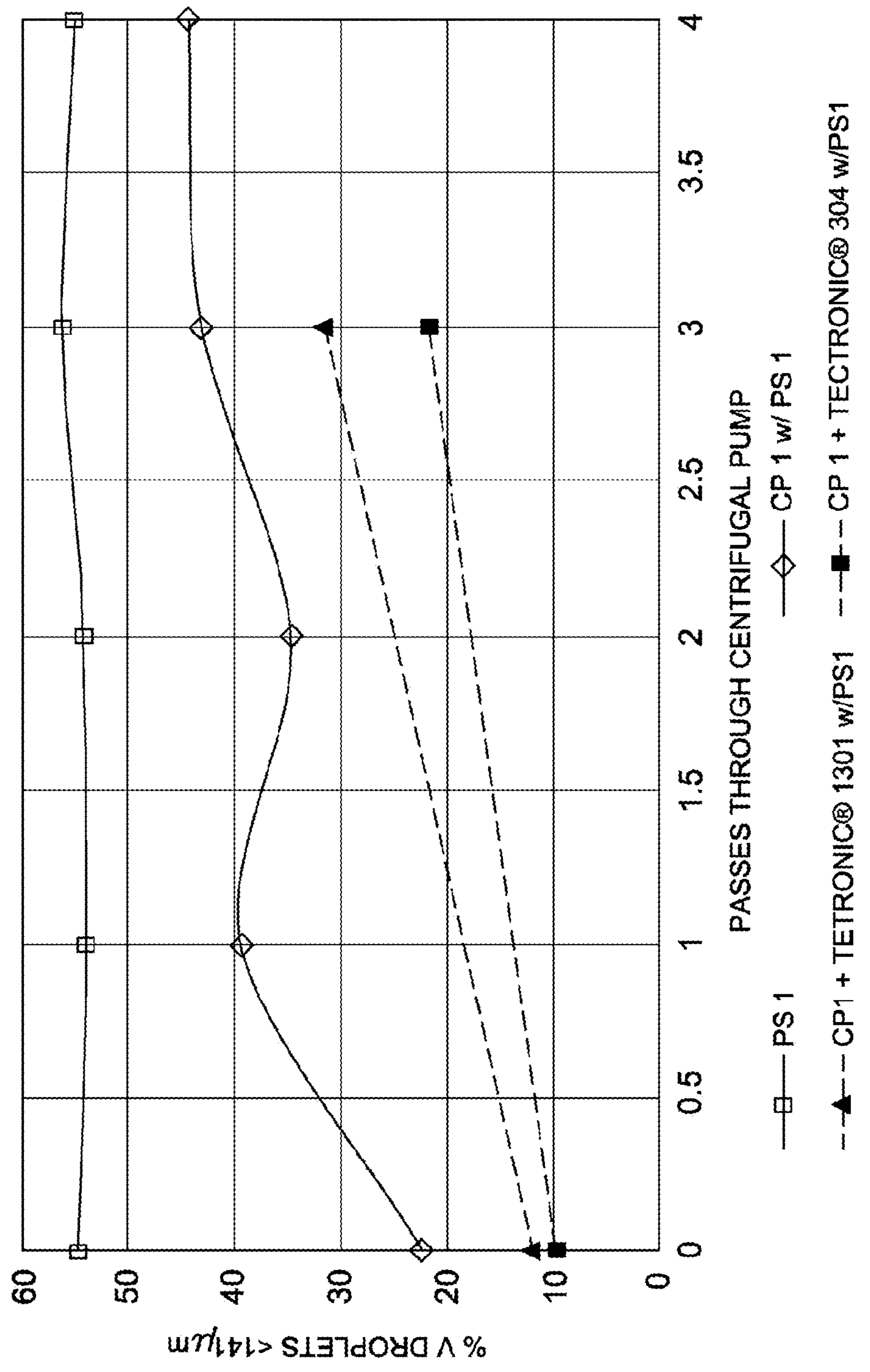
FIG. 7 is a graph illustrating the results of Example 6 which demonstrates the effect of 2 different TETRONIC® additives (BASF Corporation), TETRONIC® 304 and TETRONIC® 1301 at a 0.25% inclusion level with the PS1 pesticide solution and with or without the hydrated polyacrylamide co-polymer CP1 at a concentration of 0.625% when cycled multiple times through the pump system of FIG. 1 and subsequently sprayed through the XR8002VS (TeeJet Technologies) nozzle for droplet analysis.

As shown by the data and FIG. 7, compositions incorporating CP1 experienced a 21% change in droplet size after 10 passes through the pump system with no additive and a 12% and 20% change when 0.25% of Tetronic 304 or Tetronic 1301 (BASF Corporation), respectively, was included. FIG. 7 further illustrates that the compositions containing an additive experienced less variation in droplet size as evidenced by the lower percentage of droplets that had a volume less than 141 μm at each successive pass through the pump system. Droplet size of the PS1 pesticide solution alone was unaffected by the shear conditions.

EXAMPLE 7

Materials and Methods

This example tests the effect of 3 different vinyl pyrrolidone products, SA18, SA19, and SA20, having average molecular weights of 17,000, 30,000, and 90,000, respectively, at a 0.020% inclusion level with PS1, PS2, or a combination of PS1 and PS2 pesticide solution and with or without the hydrated polyacrylamide co-polymer Polymer CP1 or CP3 at a 0.625% concentration or at a concentration of 80% when cycled multiple times through the pump system of FIG. 1 and subsequently sprayed through the TTI11004 (TeeJet Technologies) nozzle for droplet analysis. The parameters and results of this example are provided below in Table 7 and in FIGS. 8*a* and 8*b*.

TABLE 7

| Shear Additive | Conc. | Polymer | Conc. PPM | Pesticide | Nozzle | psi | Starting % V < 141 µ | Pump Passes | Final V % < 141 µ | ΔV % |
|---|---|---|---|---|---|---|---|---|---|---|
| None | — | None | — | PS 2 | TTI11004 | 63 | 2.36 | 10 | 2.36 | 0 |
| None | — | CP 1 | — | PS 2 + PS 1 | TTI11004 | 63 | 2.01 | 10 | 3.19 | 1.18 |
| SA 18 | 0.020% | CP 1 | 80 | PS 2 + PS 1 | TTI11004 | 63 | 1.24 | 10 | 2.08 | 0.84 |
| SA 19 | 0.020% | CP 1 | 80 | PS 2 + PS 1 | TTI11004 | 63 | 1.32 | 10 | 1.64 | 0.32 |
| None | — | None | — | PS 2 | TTI11004 | 63 | 2.62 | 10 | 2.62 | 0 |
| None | — | CP 3 | 50 | PS 2 + PS 1 | TTI11004 | 63 | 1.97 | 10 | 3.25 | 1.28 |
| SA 19 | 0.020% | CP 3 | 80 | PS 2 + PS 1 | TTI11004 | 63 | 1.44 | 5 | 1.91 | 0.47 |
| SA 20 | 0.020% | CP 3 | 80 | PS 2 + PS 1 | TTI11004 | 63 | 1.27 | 5 | 2.50 | 1.23 |

| Polymers | | ave MW |
|---|---|---|
| SA 18 | vinyl pyrrolidone homopolymer | 17,000 |
| SA 19 | vinyl pyrrolidone homopolymer | 30,000 |
| SA 20 | vinyl pyrrolidone homopolymer | 90,000 |

Results

Figure 8A:
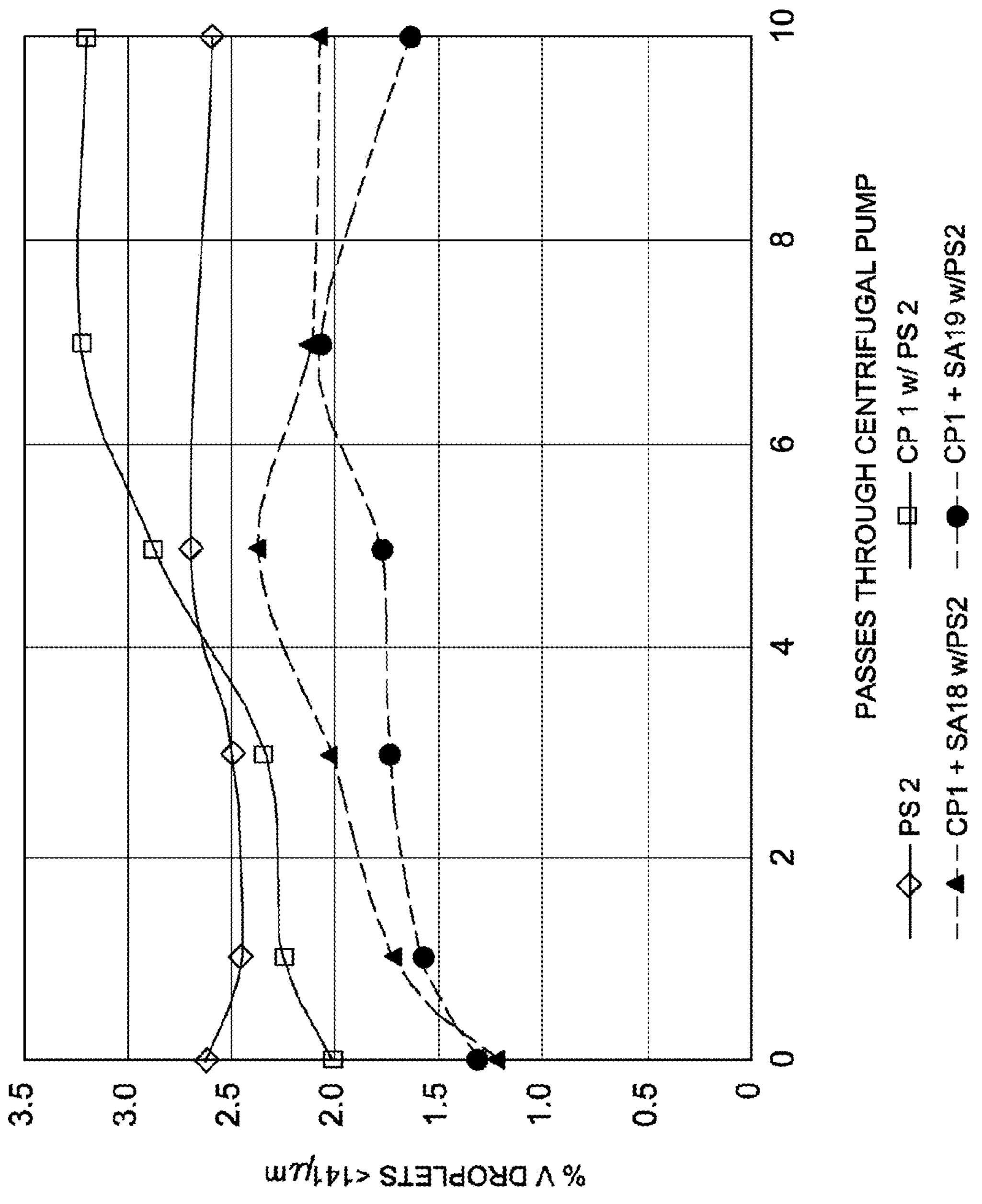
FIG. 8 is a series of graphs, 8*a* and 8*b*, illustrating the results of Example 7 which demonstrates the effect of 3 different vinyl pyrrolidone homopolymer products, SA18, SA19, and SA20, at a 0.02% inclusion level with the PS1, pesticide solution 2 (“PS2”), which is a 1.1% v/v solution of a 42.8% diglycol amine salt of dicamba herbicide formulation such as XTENDIMAX® with VAPORGRIP® TECHONOLOGY (Bayer Crop Science, Research Triangle Park, N.C. (formerly Monsanto, St. Louis, Mo.)), or combination of PS1 and PS2 pesticide solutions and with or without the hydrated polyacrylamide co-polymer Polymer CP1 or CP3 at 2 concentrations when cycled multiple times through the pump system of Protocol 2 of FIG. 1 and subsequently sprayed through the TTI11004 nozzle (TeeJet Technologies) for droplet analysis.
Figure 8B:
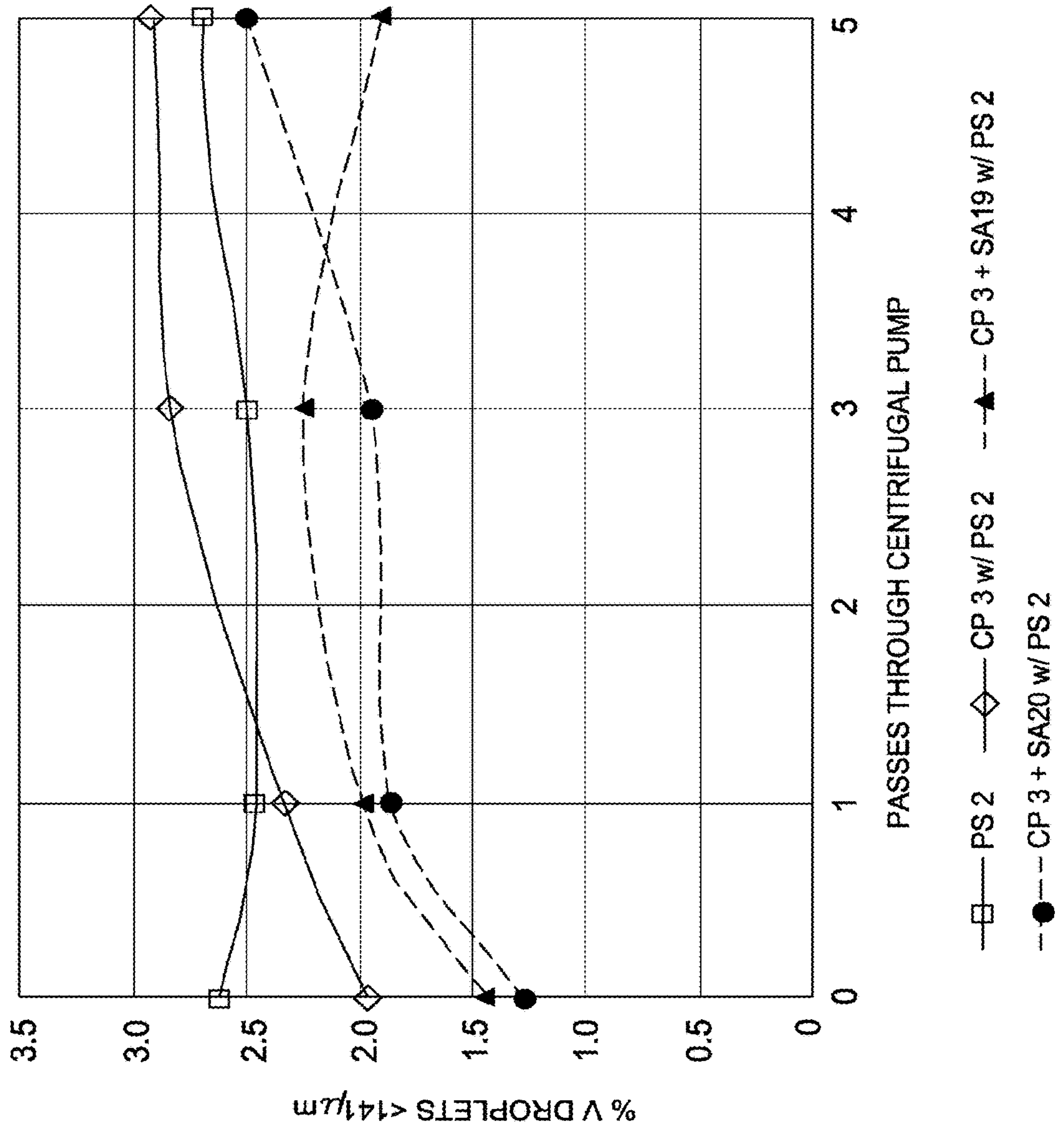

As shown by the data, compositions incorporating Polymer CP1 experienced a 1.18% change in droplet size after 10 passes through the pump system with no additive and a 0.84% and 0.32% change when 0.020% of SA18 or SA19, respectively, was added. Polymer CP3 experienced a 1.28% change in droplet size after 10 passes through the pump system of FIG. 1 with no additive and a 0.47% and 1.23% change when SA19 and SA20, respectively, was added. FIGS. 8*a* and 8*b* illustrate that the compositions containing an additive experienced less variation in droplet size as evidenced by the lower percentage of droplets that had a volume less than 141 µm at each successive pass through the pump system. Droplet size of the pesticide solution alone was unaffected by the shear conditions.

Discussion

The data demonstrate that inclusion of at least one additive of the present disclosure has a surprising effect on the stability of a high molecular weight polyacrylamide co-polymer in a water solution. The stability is evidenced by a comparison of the droplet size during multiple passes through a pump system that subjects the water solution to high shear conditions. The at least one additive can have the formula of Formula 1, $R_1$—O-$EO_a$—$PO_b$-$EO_c$—$PO_d$—$R_2$ wherein $R_1$ is hydrogen or any $C_1$ to $C_{18}$ carbon or carbon chain; O is oxygen, $EO_a$ is —($CH_2CH_2$—O)$_a$ where a can be from 0-500; $PO_b$ is —(CH($CH_3$)$CH_2$—O)$_b$ where b can be from 0-70; $EO_c$ is —($CH_2CH_2$—O)$_c$ where c can be from 0-150; $PO_d$ is —CH($CH_3$)$CH_2$—O)$_d$ where d is from 0-30; and $R_2$ is hydrogen or any $C_1$ to $C_{18}$ carbon or carbon chain. The at least one additive can also be a tetra functional block co-polymer. Preferably, the tetra functional block co-polymer is based on ethylene oxide and propylene oxide. The at least one additive can also be a polyvinylpyrrolidone homopolymer (hereinafter "PVP"). Finally, the additive can comprise any combination of the additives described above. In other words, the additive can comprise one or more additives individually and respectively selected from the additives described above. For example, the additive can comprise one or more additives having the formula of Formula 1, one or more tetra functional block co-polymers, and/or one or more PVP additives. Further, the additive can comprise at least one additive of Formula 1, and/or at least one tetra functional block co-polymer, and/or at least one PVP additive.

As shown by the data, the droplet size of the pesticide solution alone was not affected by the shear conditions. However, the droplet size of the solutions that did not include at least one additive were adversely effected as each cycle through the pump system resulted in greater change in droplet size than solutions that did include at least one additive as described herein.

What is claimed is:

1. A composition comprising:

A) a hydrated polyacrylamide homopolymer or co-polymer present in the composition in an amount from 10 ppm to 200 ppm;

B) at least one additive selected from the group consisting of:

i) a component having an average calculated molecular weight between 350-22,000 g/mol and having the formula $$R_1\text{—O-}EO_a\text{-}PO_b\text{-}EO_c\text{-}PO_d\text{—}R_2 \quad \text{(Formula 1)}$$

wherein $R_1$ is $C_1$ to $C_{18}$ carbon chain; O is oxygen, $EO_a$ is —($CH_2CH_2$—O) a where a can be from 0 to 500; $PO_b$ is —(CH($CH_3$)$CH_2$—O)$_b$ where b can be from 0 to 70; $EO_c$ is —($CH_2CH_2$—O)$_c$ where c can be from 0 to 150; $PO_d$ is —CH($CH_3$)$CH_2$—O)$_d$ where d is from 0 to 30; and $R_2$ is $C_1$ to $C_{18}$ carbon chain;

ii) a tetra functional block copolymer;

iii) a polyvinylpyrrolidone (PVP) homopolymer; and iv) any combination thereof; and C) a water solution, wherein the water solution contains at least one agrochemical component, and wherein the at least one additive is included in an amount from 0.001% to 40% by weight based on the total weight of the composition, wherein the composition is a sprayable composition for agricultural applications.

2. The composition of claim 1, wherein the average calculated molecular weight of Formula 1 is between 400-8,000 g/mol.

3. The composition of claim 1, wherein the average calculated molecular weight of the tetra functional block copolymer is between 4,000-30,000 g/mol.

4. The composition of claim 1, wherein the average calculated molecular weight of the tetra functional block copolymer is between 1,000-8,000 g/mol.

5. The composition of claim 1, wherein the molecular weight of the PVP homopolymer is between 2,000-180,000 g/mol.

6. The composition of claim 1, wherein the agrochemical component is a pesticide.

7. The composition of claim 1, wherein more than one B component is included.

8. A method of forming a composition for reducing the effects of shear on a hydrated polyacrylamide homopolymer or co-polymer comprising the step of forming the composition of claim 1 by combining the A component, the B component, and the C component.

9. A method for reducing the effects of shear on a hydrated polyacrylamide co-polymer comprising the step of forming the composition of claim 1 by combining the A component, the B component, and the C component and combining the composition of claim 1 with a water solution containing the hydrated polyacrylamide homopolymer or co-polymer.

10. The method of claim 9, wherein a droplet size distribution is maintained or increases at a slower rate upon application of shear in compositions that include the additive.

11. A method for stabilizing the interaction of the long strands of a hydrated polyacrylamide homopolymer or co-polymer in a water solution subjected to shear conditions comprising the step of forming the composition of claim 1 by combining at least one A component, at least one B component, and at least one C component of claim 1.

12. The method of claim 11, wherein the stabilized interaction of the long strands of the hydrated polyacrylamide homopolymer or co-polymer are demonstrated by a slower rate of increasing droplet size distribution.

13. A composition comprising:

A) a hydrated polyacrylamide homopolymer or co-polymer present in the composition in an amount from 10 ppm to 200 ppm;

B) at least one additive selected from the group consisting of:

i) a component having an average calculated molecular weight between 350-22,000 g/mol and having the formula $$R_1\text{—O-EO}_a\text{-PO}_b\text{-EO}_c\text{-PO}_d\text{—}R_2 \quad \text{(Formula 1)}$$

wherein $R_1$ is hydrogen or any $C_1$ to $C_{18}$ carbon chain; O is oxygen, $EO_a$ is —($CH_2CH_2$—O) a where a can be from 0 to 500; $PO_b$ is —(CH($CH_3$)$CH_2$—O) b where b is 0; $EO_c$ is —($CH_2CH_2$—O)$_c$ where c can be from 0 to 150; $PO_d$ is —CH($CH_3$)$CH_2$—O)$_d$ where d is 0; and $R_2$ is hydrogen or any $C_1$ to $C_{18}$ carbon chain;

ii) a tetra functional block copolymer;

iii) a polyvinylpyrrolidone (PVP) homopolymer; and iv) any combination thereof; and C) a water solution, wherein the water solution contains at least one agrochemical component, and wherein the at least one additive is included in an amount from 0.001% to 40% by weight based on the total weight of the composition, wherein the composition is a sprayable composition for agricultural applications.

14. A composition comprising:

A) a hydrated polyacrylamide homopolymer or co-polymer present in the composition in an amount from 10 ppm to 200 ppm;

B) at least one additive selected from the group consisting of:

i) a component having an average calculated molecular weight between 350-22,000 g/mol and having the formula $$R_1\text{—O-EO}_a\text{-PO}_b\text{-EO}_c\text{-PO}_d\text{—}R_2 \quad \text{(Formula 1)}$$

wherein $R_1$ is hydrogen or any $C_1$ to $C_{18}$ carbon chain; O is oxygen, $EO_a$ is —($CH_2CH_2$—O) a where a is 0; $PO_b$ is —(CH($CH_3$)$CH_2$—O)$_b$ where b can be from 0 to 70; $EO_c$ is —($CH_2CH_2$—O)$_c$ where c is 0; $PO_d$ is —CH($CH_3$)$CH_2$—O) d where d is from 0 to 30; and $R_2$ is hydrogen or any $C_1$ to $C_{18}$ carbon chain;

ii) a tetra functional block copolymer;

iii) a polyvinylpyrrolidone (PVP) homopolymer; and iv) any combination thereof; and C) a water solution, wherein the water solution contains at least one agrochemical component, and wherein the at least one additive is included in an amount from 0.001% to 40% by weight based on the total weight of the composition, wherein the composition is a sprayable composition for agricultural applications.

* * * * *